United States Patent [19]
Goddard et al.

[11] Patent Number: 4,463,386
[45] Date of Patent: Jul. 31, 1984

[54] FACSIMILE DATA REDUCTION

[75] Inventors: Robert D. Goddard; Robert R. Schomburg, both of Boulder; Wayne L. Wohler, Longmont, all of Colo.

[73] Assignee: International Business Machines Corporation, Armonk, N.Y.

[21] Appl. No.: 373,937

[22] Filed: May 3, 1982

[51] Int. Cl.³ .............................................. H04N 1/41
[52] U.S. Cl. .................... 358/261; 358/263; 358/260
[58] Field of Search .................. 358/261, 263, 260; 382/34, 9

[56] References Cited

U.S. PATENT DOCUMENTS

| | | | |
|---|---|---|---|
| 3,883,847 | 5/1975 | Frank | 340/146.1 R |
| 3,980,809 | 9/1976 | Cook | 178/6 |
| 4,091,424 | 5/1978 | Widergren | 358/260 |
| 4,103,287 | 7/1978 | Frank | 340/146.3 H |
| 4,191,974 | 3/1980 | Ono et al. | 358/261 |
| 4,291,339 | 9/1981 | Ogawa et al. | 358/260 |
| 4,302,775 | 11/1981 | Widergren et al. | 358/136 |
| 4,319,225 | 3/1982 | Klose | 340/347 |

OTHER PUBLICATIONS

IBM Technical Disclosure Bulletin, Wong, K. Y., "Picture Restoration Algorithm for Facsimile Machines", vol. 19, No. 2, Jul. 1976, pp. 668-671.

*Primary Examiner*—John C. Martin
*Assistant Examiner*—John Peng, Jr.
*Attorney, Agent, or Firm*—Carl M. Wright; Homer L. Knearl

[57] ABSTRACT

Facsimile or other data to be reduced is scanned and segmented into blocks of isolated figures. The figures are compared to stored templates. If no match is found, the figure remains in place. If a match is found, the figure is erased, i.e., the block is reduced to white. When recognized figures have been erased, the residual image is transmitted using an efficient known two-dimensional encoding compression technique. The locations of figures are specified by inserting identifying data in the data stream at a point corresponding a point on the figure, the preferred point being the lower right-hand corner. If not a recognized template, the receiving end can extract the figure constructed from the data stream and store it in its template memory. If a figure is a recognized template, it is extracted from the receiving end's template memory using the identifying data and inserted into the reconstructed residual image.

9 Claims, 16 Drawing Figures

PEL NUMBER

| SCAN NO. | 1 | 2 | 3 | 4 | 5 | 6 | 7 | 8 | | 1726 | 1727 | 1728 |
|---|---|---|---|---|---|---|---|---|---|---|---|---|
| 1 | 0000 | 0001 | 00002 | 0003 | 0004 | 0005 | 0006 | 0007 | | 1725 | 1726 | 1727 |
| 2 | 1728 | 1729 | 1730 | 1731 | 1732 | 1733 | 1734 | 1735 | | 3453 | 3454 | 3455 |

| | 1 | 2 | 3 | 4 | 5 | 6 | 7 | 8 | | | | |
|---|---|---|---|---|---|---|---|---|---|---|---|---|
| 6 | 8640 | 8641 | 8642 | 8643 | 8644 | 8645 | 8646 | 8647 | | 10365 | 10366 | 10367 |
|   | 0 | 1 | 1 | 0 | 1 | 1 | 0 | 0 | | | | |
| 7 | 10368 | 10369 | 10370 | 10371 | 10372 | 10373 | 10374 | 10375 | | 12093 | 12094 | 12095 |
|   | 0 | 1 | 1 | 1 | 1 | 1 | 1 | 0 | | | | |
| 8 | 12096 | 12097 | 12098 | 12099 | 12100 | 12101 | 12102 | 12103 | | 13821 | 13822 | 13823 |
|   | 0 | 1 | 1 | 1 | 1 | 1 | 1 | 0 | | | | |
| 9 | 13824 | 13825 | 13826 | 13827 | 13828 | 13829 | 13830 | 13831 | | 15549 | 15550 | 15551 |
|   | 0 | 0 | 1 | 1 | 1 | 1 | 1 | 0 | | | | |
| 10 | 15552 | 15553 | 15554 | 15555 | 15556 | 15557 | 15558 | 15559 | | 17277 | 17278 | 17279 |
|   | 0 | 0 | 0 | 1 | 1 | 1 | 0 | 0 | | | | |
| 11 | 17280 | 17281 | 17282 | 17283 | 17284 | 17285 | 17286 | 17287 | | 19005 | 19006 | 19007 |
|   | 0 | 0 | 0 | 0 | 0 | 0 | 0 | 0 | | | | |

FIG. 9

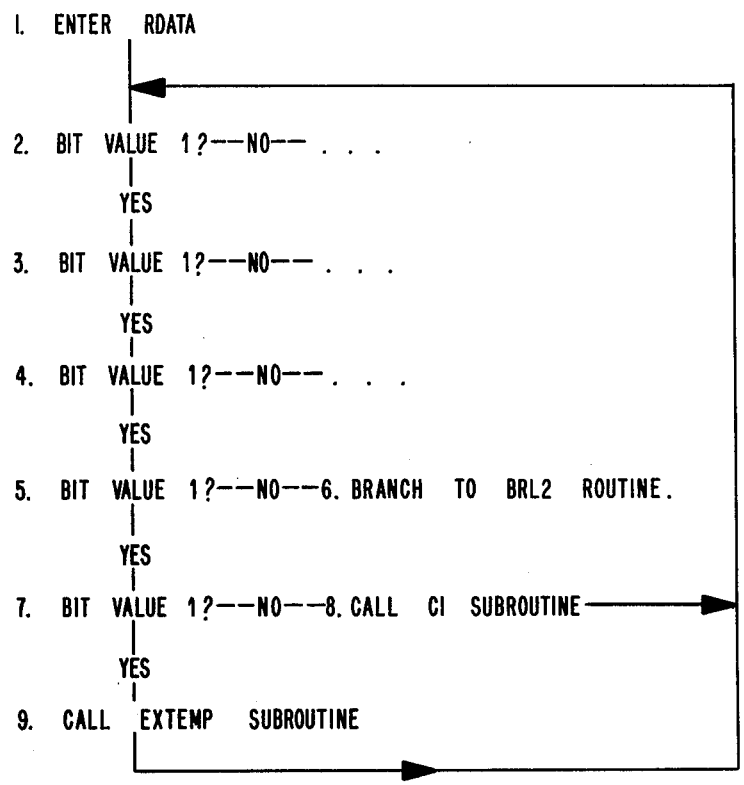
FIG. II

FACSIMILE DATA REDUCTION

TABLE OF CONTENTS

Technical Field
Background Art
Disclosure of the Invention
Brief Description of the Drawing
System Description
    Segmentation
    Recognition
    Encoding
    Conclusion
Appendix
Claims
Abstract
Subroutines
    SEGMENT
    BLOCK
    UPDATBLK
    NEXTBLK
    MERGEBLK
    CLOSEBLK
    INSRTBLK
    RECOG
    NEWTEM
    GETF
    TEST
    CKSIZE
    MATCH
    EASE
Tables
    I: Organization of DATAITEM
    II: Organization of FIGURE

TECHNICAL FIELD

This invention relates to facsimile data compression, and, particularly, to a coding procedure reducing the number of information elements required for transmitting facsimile data and providing a compression ratio not achieved in the prior art.

The same techniques that are used to reduce the amount of information needed to reconstruct a page can also be applied to archival purposes, such as reducing the memory space required to digitally store documents in memories or on magnetic tapes, disks, and the like.

By reducing the data required to represent a page, which can contain printing, writing, schematics, pictures, graphs, and so on, the time required to transmit it and the space required to store it are reduced with a corresponding reduction in cost. Clearly, however, any savings realized by the reduction of data can be more than offset if the reduction process is length or requires expensive apparatus.

Data reduction is possible because of redundancy in the source material. Printed pages, for example, contain a large percentage of white (unprinted) space. The language elements, i.e., letters, words, and so on, also contain large amounts of redundancy. For example, vowels can be removed from words, parts of letters can be omitted, and certain words, such as "the", "a", and so on, can be eliminated altogether without affecting the entropy (information content) of the source. To remove redundancy completely, however, requires complex analysis of the individual symbology in the framework of the entire construction.

Predictive techniques have been used to reduce data redundancy. Written material can be predicted to a fair degree because certain letters tend to follow others with a high degree of probability, and some letters predominate as the initial and terminal letters of words. This predictability provides the basis for advanced cryptanalysis.

Data compression techniques, though, exhibit a diminishing efficiency after an initial reduction phase. That is, fairly simple techniques provide a good degree of reduction, but the increased reduction effected by continually more complex techniques is not commensurate with the extra effort required.

Thus, in terms of efficiency, it is usually preferable to effect as much data reduction as possible with less complex but fast procedures even though a large amount of redundancy may remain in the reduced data.

BACKGROUND ART

Standards have been proposed by a study group of the CCITT to achieve some compatibility among the digital facsimile equipments that are linked through telephone networks. The objective is to transmit an A4 document, about 8½ by 12 inches, over a telephone line in one minute, using 1728 pels per line and 1188 lines per page. This amounts to 2,052,864 pels per page, requiring a transmission rate of 34.2 kilobits/second.

The present 9600 baud maximum feasible transmission rate over telephone lines is equal to 9.6 kilobits/second, using non-return-to-zero coding. Therefore, a page would require 7 minutes, 8 seconds for transmission. A resolution of 3.85 lines per mm is approximately 100 lines per inch. High resolution facsimile uses higher resolution, averaging about 203 lines per inch which is approximately a horizontal resolution of 8 pels/mm. An 8½×11 inch document having a resolution of 8 pels/mm in both dimensions contains 3,860,637 pels. At 4.8 kilobits/second, 13.5 minutes would be required to transmit a page.

To reduce transmission times, data is compressed, i.e., the number of bits required to convey the information is reduced with no significant loss of information. This is possible because of the redundant information previously described.

Data can be reduced by taking advantage of statistical relationships, which is another type of redundancy. For example, some letters occur more often than others. In English, for example, E occurs most frequently, followed in order of frequency by T, O, A, N, I, R, S, C, H and so on. To encode all the letters, numerals, and punctuation marks requires six bits per character. Taking advantage of the knowledge of this frequency, fewer bits are assigned to represent E than to represent Z or Q, relatively infrequent letters. The sequences of bits must be unique so that no bit combination of two frequent letters is the same code as that for an infrequent letters. Consider the following assignment:

| E | 00   | I | 1011  |
|---|------|---|-------|
| T | 01   | R | 1100  |
| O | 1000 | S | 1101  |
| A | 1001 | C | 1110  |
| N | 1010 | H | 11110 |

Sending THE SCORE IS A TIE using 6 bits per character (and ignoring spaces) requires 84 bits. Using the above assignment, only 47 bits are required. The beginning is 01111100011011110 . . . . The first two elements are recognized as T. The next sequence of four ones eliminates all but H which is identified by the following zero. It is easily verified that no ambiguity exists even though fewer than half the number of bits is required to encode the message. Such codes are called variable length codes or Huffman codes. The Morse code is an example of such a code and exhibits a high inverse coefficient of correlation between letter frequency and the time required for transmission.

In facsimile transmission, however, individual letters are not considered, only sequences usually of black and white spots as pels (picture elements). These sequences are encoded as series of logical ones and zeros. Viewed as a Markov chain, the series leads to the idea of run-length coding. (Being of Markov chain merely denotes that the probability of a white pel or black pel occurring is not independent from the preceding pels). Run length coding uses a code to represent the number of pels in a sequence of the same color. For example, a sequence of 100 white pels, instead of being transmitted as 100 zeros, is transmitted as a code indicating the color followed by a code indicating 100. Alternatively, the numbers only need be used, the color alternating for each number. Significantly fewer bits are required.

A refinement combines the above two techniques. The statistical relationships underlying the frequency distribution of certain run lengths can be used to assign variable length codes. This is a popular coding scheme, known as a one-dimensional Huffman run-length encoding. The code usually used is a modified Huffman code. This scheme provides efficient compression, typically providing compression ratios between 6 and 22 depending on the source documents.

U.S. Pat. No. 4,091,424 discloses another prior art approach to data compression that is apparently useful with printed text. The principle is to enclose each character with the smallest possible rectangle. The data in the rectangle is then encoded and transmitted with information identifying the coordinates of the initial pel of the character and the size of the rectangle. At the receiving end, the encoded data is used to reconstruct the character in the position indicated by the coordinate and size information. Further compression is achieved by maintaining a library of characters at both the receive and transmit ends. If a character matches one in the library, only an identifier is sent with the coordinate information, reducing the amount of information required to be transmitted. The method shown in the patent is restricted to printed text and requires storing a full page at both the transmit and the receive ends.

The present invention, by transmitting the residual information remaining after a recognized figure is erased, can be used for all printed or pictorial information.

Other prior art systems increase their compression ratios by combining or skipping alternate lines. Prior art references representative of this approach include U.S. Pat. No. 4,291,339 (Ogawa et al.) and "Picture Restoration Algorithm for Facsimile Machines," K. Y. Wong, *IBM Technical Disclosure Bulletin,* Vol. 19, No. 2, July 1976, pp. 668–671. Since the present invention operates on each individual line, this prior art is not further discussed.

Background material useful for understanding the present state of the art includes "A Means for Achieving a High Degree of Compaction on Scan-Digitized Printed Text," R. N. Ascher and George Nagy, *IEEE Transactions on Computers,* Vol. C-23, No. 11, November 1974, pp. 1174–1179; U.S. Pat. Nos. 4,191,974 (Ono et at.); and 3,980,809 (Cook).

Run-length encoding schemes are described in U.S. Pat. Nos. 3,883,847 and 4,103,287; "High Fidelity Encoding of Two-Level, High Resolution Images," A. J. Frank, *IEEE Int'l Conf. on Communications,* June 1973, pp. 26-5 to 26-11; "International Digital Facsimile Coding Standards," Roy Hunter and A. Harry Robinson, *Proceedings of the IEEE,* Vol. 68, No. 7, July 1980, pp. 854–867; "Two-Dimensional Facsimile Coding Scheme," Joan L. Mitchell and Gerald Goertzel, *ICC 1979 Conference Record,* 8.7.1–8.7.5; "Proposed Addition to Draft Recommendation T.4—Standardization of Group 3 Facsimile Apparatus for Document Transmission," *CCITT Study Group XIV,* Kyoto, Nov. 7–15, 1979 (Temporary Document No. 39-E); "Facsimile Image Coding," Joan L. Mitchell, *AFIPS Conference Proceedings,* Vol. 49, National Computer Conference 1980, pp. 423–426; "Recent Advances in Data-Conversion Facsimile Techniques," W. B. Pennebaker, G. Goertzel, and J. L. Mitchell, *Journal of Applied Photographic Engineering,* Vol. 6, No. 4, August 1980, pp. 93–96.

DISCLOSURE OF THE INVENTION

In accordance with the present invention, figures on the original source documents are segmented by enclosing them with the smallest possible rectangle. Vertical heights greater than a given maximum are truncated at the maximum. Rectangles having less than a given minimum height or width are ignored. The segmented figures are compared with templates, previously stored segmented figures. If a figure matches a template, i.e., is recognized, the rectangular area of the figure is erased, leaving a white area in its place. After all recognized figures have been erased, the residual image is encoded, using, for example, a two-dimensional modified Huffman-type code. Since the compression ratio improves with increased white space, the residual image encoding exhibits extremely high compression ratios.

The encoded residual information is transmitted as a data stream which includes at certain points the insertion of template and recognized figure information. The desirable insertion point in the data stream is one pel space below and to the lower right-hand corner of the figure or template's former position. The template information is identified by a special code, which is preferably its list position, and indicates that such a figure was previously recognized. If not recognized, it has not been erased, permitting the receiving end to extract (but not erase) it from the image, as reconstructed from the data stream, and store it as a template. If recognized, the figure, identified by the special code, is extracted from the stored templates at the receiving end and inserted into the reconstructed residual image.

By limiting the enclosing rectangles to maximum and minimum heights and inserting figure information at the locating points in the data stream, an entire page need not be stored at either end. In the preferred embodiment, a wrap-around buffer that stores only a portion of the page is used. Inserting the information at the certain points also eliminates the need to send coordinate locating information, thereby further reducing the amount of data required to be transmitted.

In the preferred embodiment, the templates are stored as data items in a linked list. One implementation uses a double-linked list. The use of linked lists in lieu of an ordered memory storage significantly reduces the processing time required to encode the information, to compare derived figures with stored templates, and to insert or to delete templates in the memory.

Available memory space is more efficiently utilized by providing the capability of expunging the least recently used template from the memory when a new template is to be inserted in a full template memory. This can be accomplished by bringing the most recently matched template to the top of the list and replacing the last template in the list with the new template. Alternatively, a field in the template data item can be used to count the number of times it has been matched. The new template would then replace the template exhibiting the fewest matches. The former method has the advantage of quickly adapting to new figures, especially when the nature of the source changes. The latter method has the advantage of retaining the most used templates in memory. The methods can be combined to utilize the advantages of both. The result is that the probability of matching is increased, which results in better average compression ratios.

In a variation from the described embodiment, the inserted new template description, i.e., a flag followed by the Huffman-encoded height and width, is eliminated to provide improved compression at the expense of increased decoder processing. The decoder must run the same segmentation algorithm as the encoder. The decoder sees only the residual image, however, so that every figure it finds must be a new template. Consequently, the decoder discovers the same templates in the same positions and order as in the explicit flag method. Placing newly-found templates in the receiving end's template list according to the same algorithm as in the transmitting end's list insures that both lists are the same.

BRIEF DESCRIPTION OF THE DRAWING

FIG. 3 is an example of the contents of a scan memory used in the description of the segmentation techniques employed in the invention.

FIG. 9 is a diagram showing a section of the video memory containing a figure.

FIG. 11 is a flowchart of a code recognition process.

SYSTEM DESCRIPTION

Figure 1:
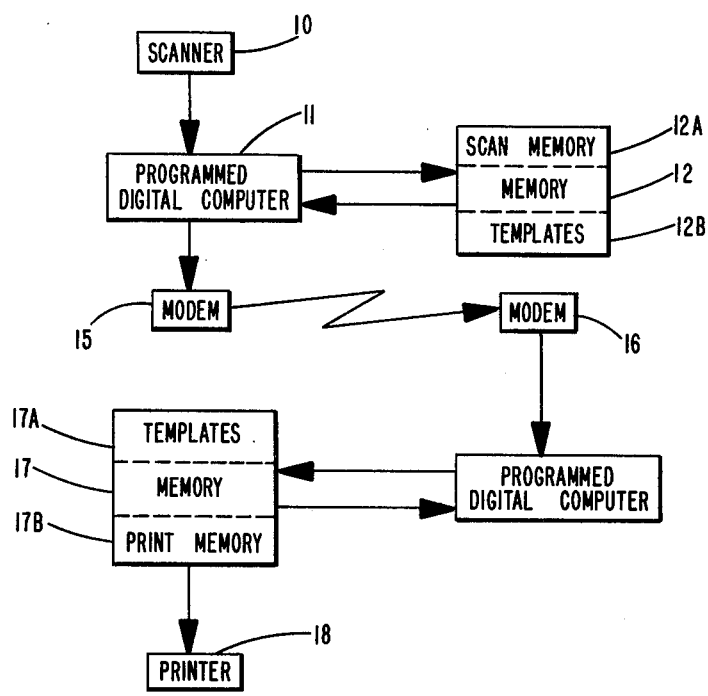
FIG. 1 is a block diagram of a system in which the invention can be advantageously employed.

The embodiment of the invention to be described can be used in a system such as shown in FIG. 1. An optical feed-through scanner 10 is used to scan input sources which can include documents of printed text, pictorial information, or combinations of both, i.e., all types of graphic images. The scanner 10 includes a thresholding circuit which digitizes the scan information into two levels. One level, logical 0, represents white pels and the other level, logical 1, represents black pels. (These assignments can be reversed, especially if the predominant pels are black.) A pel is a picture element produced by the scanner 10 which resolves the source information into eight lines per millimeter and eight pels per millimeter, corresponding to 203 pels per inch in both directions. Such scanners are well known in the art and need not be described in more detail for an understanding of the invention.

The scanner 10 is controlled by a programmed digital computer 11 which supplies operating commands to the scanner and receives the digitized information, which is stored in a scan memory 12a. The scan memory can be implemented as part of the transmitting system's main memory 12 as shown or can be implemented separately. The scan memory in this embodiment is organized figuratively as 32 rows of 1728 bits each, each bit storing a pel. Memories are usually organized in bytes or words, but for purposes of explanation, the scan memory is considered to be organized on a bit-addressable basis. Each row of the scan memory represents a scan line from the input document. At a resolution of 8 pels/mm (203 pels/inch), the standard 8½ inch wide document (216 mm) will require 1728 pels per line. The scan memory is designed as a circular, or wraparound, buffer so that, after the row 32 has been scanned and stored, the next scan line will be stored in row 1.

After the scanner has stored a certain number of rows in the scan memory, the computer 11 initiates a segmentation procedure. Segmentation detects contiguous black pel groups and fits around each group the smallest rectangle that will encompass each separate group so detected. Groups smaller than four or greater than thirty pels in either dimension are not segmented. Those smaller than four pels are ignored. Those larger than thirty are divided into rectangles having a maximum height of thirty pels. Groups wider than thirty are not so divided but are not given to recognition. When a group has been isolated, it is supplied as a figure to the recognition procedure. A figure is described by its height and width in pels, the total number of black pels contained in the figure, and the scan row and pel column of the figure's lower right-hand corner. The segmentation procedure operates in the same wraparound fashion as the scanning input.

The next step in the compression process is recognition of figures. A template memory 12b, which can also be part of the main memory 12, contains figures that have been segmented. The first time a particular figure is segmented, it is put into the template memory because it is not recognized, there being no such template stored. Once the template memory contains a certain number of templates, there will probably be figures matching those that have been stored in the template memory 12b. When a figure matches a template in the template memory, that figure is erased from the scan memory, i.e., the entire rectangular area described by the figure parameters is erased. It thereafter appears to the encoding procedure, described below, as a white block.

At least 30 rows behind the segmentation and recognition procedures, an encoding procedure is reducing the residual information in the scan memory to run-length coding. The encoding must be at least 30 rows behind because the recognition procedure, in erasing a large recognized figure, can affect the previous 30 rows, the maximum height of a figure. Other methods can be used for encoding the scan memory residual information. The embodiment being described uses a modified version of a two-dimensional coding algorithm. Such encoding of the scan memory residual information can be implemented by those of ordinary skill in the art, the actual process not being part of the invention.

The encoded information is then sent to the receiving system, e.g., through a pair of modems 15 and 16. The encoded information is decoded by the receiving system and stored in a print memory 17b. The data stream transmitted over such a link includes the scan memory residual encoded information having special information inserted at appropriate places in the data stream. The appropriate places correspond to the lower right-hand corner of a figure. The special information includes an identifier depending on whether the figure was recognized or not. If the figure had not been recognized, it would not have been erased from the scan memory and is therefore received as part of the encoded data stream. The receiving system, upon receipt of the special information, or, if the receiving end runs its own segmentation routine, extracts the reconstructed figure from its print memory 17b and stores it in its own template memory 17a. The figure is not erased from the print memory 17b. If the figure had been recognized, the identifying information is used to extract the figure from the template memory 17a and to insert it in the print memory 17b at the location determined by its lower right-hand corner, corresponding to the point in the data stream where the special information was inserted. This precludes the necessity of sending coordinate information locating the figure and of storing an entire page before transmission. Erasing recognized figures from the scan memory before encoding makes the encoding algorithm more effective and increases the compression ratio because the amount of white space is increased.

It is preferable to insert the special information in the data stream at a point just after the pel below the lower right-hand corner of the figure for several reasons. One reason is that the segmentation procedure defines a figure when it detects its lower boundary. Since the figures must be presented to the receiver in the same order in which they were presented to the recognition procedure, the insertion point is below the bottom.

A second reason is that if the insertion point were just after the lower right pel of the figure, the two-dimensional compression and decompression algorithms could fail because the encoder and decoder could have different history lines (used in two-dimensional encoding) during their operation on the scan line immediately below the figure. This can result from any small differences between the original and substituted figures. By moving the insertion point down one scan line and having the recognition procedure erase recognized figures immediately, the encoder and decoder operate on the scan line below the figure with a history line containing only white pels in the area of the figure. The position, however, will be referred to as the lower right-hand corner.

The choice of insertion location also helps to maintain a straight baseline in the object document when the original and substituted figures differ in height. The right-hand corner choice is not rigid; the left corner or even the middle of the figure can be used as the reference point.

At least 30 rows behind the information being placed in the print memory, a printer 18 reproduces the information by laying down black pels on an object medium. Such printers are well known in the facsimile and printing art and need not be described in detail for an understanding of the invention.

The segmentation, recognition, and encoding procedures will be described below in detail. The controlling programs are described in TYPICAL, which is summarized and explained in the appendix to this application. The use of TYPICAL makes clear the exact procedures to practice the invention and can be readily translated into any available compiler language, assembler, or machine code by those of ordinary skill in the art. It also obviates the need for flowcharts because the same information is given in more concise but more detailed and usable form. The decoding and printing procedures need not be explained in detail since the decoding is the reverse of encoding and the printing procedures are well known in the art.

SEGMENTATION

After the document scanner has stored one or more rows in the scan memory, the segmentation procedures begins. The segmentation procedure finds groups of contiguous black pels and constructs and enclosing rectangle around each group. When an isolated group has been completely outlined by the minimum rectangle that encloses it, it is transferred to a data item called a FIGURE which is used in the next step of the compression process, the recognition step.

The segmentation procedure should produce a figure for eacu character of printed text if no problems are encountered. If two characters merge together or overlap with no white space between them, the pair of characters will be treated as one figure. Figures can also be parts of characters or areas of pictures or illustrations. The maximum height and width of a figure is constrained. In the implementation to be explained in detail, both the height and width of the rectangle must be both greater than three pels and less than 31. The total number of black pels in a figure will thereby be more than three and fewer than 901.

Figure 2:
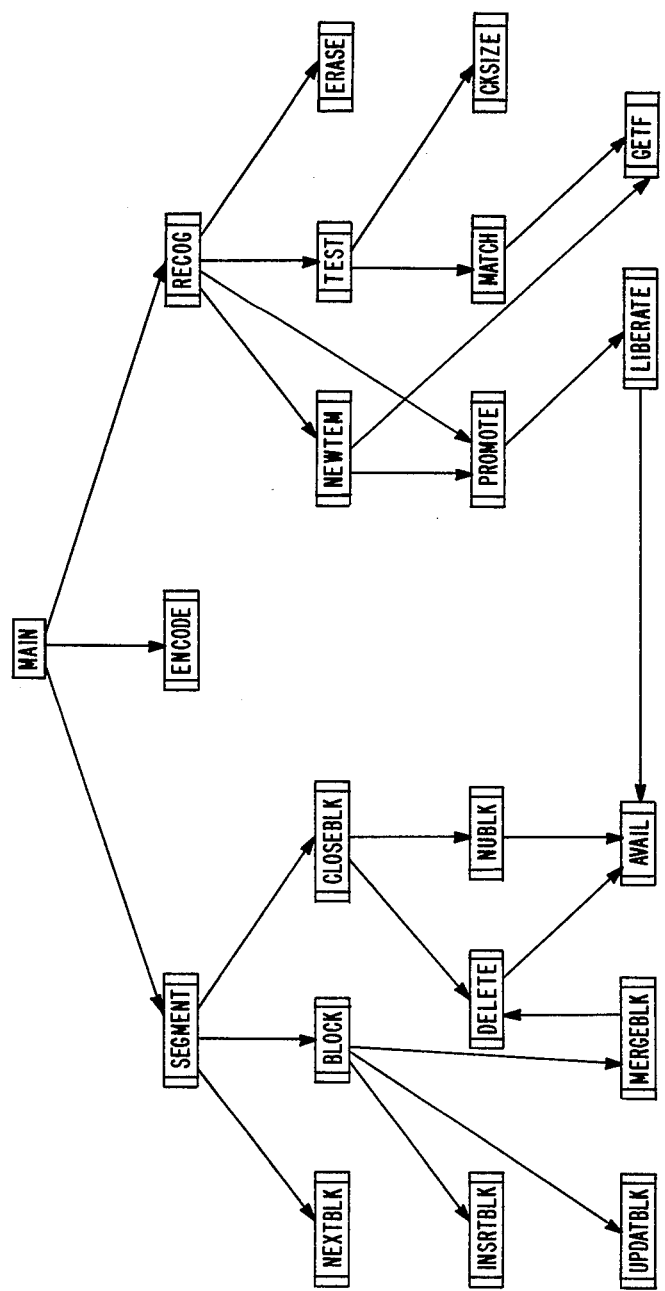
FIG. 2 is a block diagram showing the calling relationships among programmed subroutines used to practice and to explain the invention.

FIG. 2 illustrates the calling relations among the subroutines used in the following explanation of the operation of the preferred embodiment. The subroutines, shown in double-sided blocks, a standard representation, are called as indicated by the arrows. Return to the calling program is implied.

The main program calls the SEGMENT subroutine to commence segmentation. This subroutine, detailed below, detects horizontal runs of black pels in the scan memory, declared as a matrix "pel." It keeps track of the pel number of the beginning of a run (BGN) and counts the number of pels in the run (PLCNT). When the end of a run is detected, SEGMENT calls a BLOCK subroutine. At the end of every row scan, it closes all remaining unprocessed blocks. Not shown for clarity is the logic to ignore all blocks if the number of active blocks exceeds 150. The input is ignored until a totally white scan is encountered. Also not shown is the logic to ignore black runs which start at the left margin of the scan data.

---

1. enter SEGMENT (pel(1,n;1,m))
2. field DATAITEM (LHB,RHB,ACC,TOP,LUP,LNK);
   field DATAITMN (LHBN,RHBN,ACCN,TOPN,LUPN, -continued
```
        LNKN);
        field DATAITML (LHBL,RHBL,ACCL,TOPL,LUPL,
        LNKL)
 3.     STRTBLKS = −1;
 4.     FOR i = 1 TO n
 5.     DATAITEM=(STRTBLKS); DATAITML=−1;
        DATAITMN=−1
 6.     reset FLAG1; reset USEDFLAG
 7.     FOR j = 1 TO m
 8.     CASE
        :(pel(i,j) :=: 1)&(flag1)': set flag1;
        BGN = j;(+1)PLCNT,
        :(pel(i,j) :=: 1)&(flag1): (+1)PLCNT,
        :(pel(i,j) :=: 0)&(flag1): reset flag1.
 9.     END = j
10.     call BLOCK (DATAITEM,DATAITMN,DATAITML,
        STRTBLKS,BGN,END,I,PLCNT,USEDFLAG)
11.     NEXT j
12.     IF (USEDFLAG) THEN call NEXTBLK FIN
13.     WHILE DATAITEM :#: −1
14.     call CLOSEBLK
15.     LOOP
16.     NEXT i
17.     return
18.     end
```

The BLOCK subroutine, detailed below, maintains a linked list of active blocks and updates the information in appropriate blocks for every black pel run. The blocks are maintained in memory as a linked list of data items organized as tabulated below. This list of blocks is organized in order to occurrence in the scan data (left to right). BLOCK inserts a new block description if the current black run falls to the left of the currently active block. It closes the current active block if the current run falls to the right of it and it had no black runs on the current scan. If the black run overlaps the current and the next active block, these two blocks are merged. Otherwise, the black run information is used simply to update the current block definition. The black run is used to process the block list until a new block is inserted or the current active block is updated, indicating that all merging, closing, and so on has been completed. This procedure allows SEGMENT to process the block list and the scan sequentially and simultaneously. No second pass is needed for either.

Since a single run length may cause several closings or mergings of blocks, BLOCK loops until a block has been inserted or updated, indicated with the TRANSDON flag.

The USEDFLAG is used to remember that a block has been modified on the current scan. This prevents CLOSEBLK from being called in both BLOCK and SEGMENT.

TABLE I

| | Organization of DATAITEM | |
|---|---|---|
| WORD | CONTENTS | MNEMONIC |
| 1 | Left-hand boundary pel number | LHB |
| 2 | Right-hand boundary pel number | RHB |
| 3 | Top boundary scan number | TOP |
| 4 | Total number of black pels | ACC |
| 5 | Last update scan number | LUP |
| 6 | Address of next DATAITEM in list | LNK |

```
 1.  enter BLOCK (DATAITEM,DATAITML,DATAITMN,
     STRTBLKS,BGN,END,I,PLCNT,USEDFLAG)
 2.  reset TRANSDON
```

TABLE I-continued

| Organization of DATAITEM |
|---|
```
 3.   REPEAT
 4.   IF (DATAITEM :=: −1)v(END :le: LHB)
 5.   THEN call INSRTBLK (DATAITEM,DATAITML,
       STRTBLKS,BGN,END,I,PLCNT); set TRANSDON
       ELSE
 6.   IF (BGN :gt: RHB)v(i-TOP :ge: 30)
 7.   THEN IF (USEDFLAG)
 8.   THEN call NEXTBLK (DATAITEM,DATAITML,
       DATAITMN);
       reset USEDFLAG
 9.   ELSE call CLOSEBLK (DATAITEM,DATAITML,
       STRTBLKS,I)
       FIN
       ELSE
10.   DATAITMN = LNK
11.   IF (LNKN :#: −1)&(END :gt: LHBN)
12.   THEN call MERGEBLK (DATAITEM,DATAITMN)
13.   ELSE call UPDATBLK (DATAITEM,BGN,END,
       PLCNT);
       set TRANSDON
       FIN
14.   set USEDFLAG
15.   FIN
16.   FIN
17.   UNTIL (TRANSDON)
18.   return
19.   end
```

The UPDATBLK subroutine updates the current active block with the information from the black run being processed. This includes updating the LHB (left-hand bit), RHB (right-hand bit) as needed and always adding the black pel count of the run into the black pel total for the block.

1. enter UPDATBLK (DATAITEM,BGN,END,PLCNT)
2. IF LHB :gt: BGN THEN LHB=BGN FIN
3. IF RHB :lt: END THEN RHB=END FIN
4. ACC=PLCNT+ACC
5. return
6. end The NEXTBLK subroutine advances to the next block in the active block list. There are three pointers updated: DATAITML pointing to the last block processed; DATAITEM containing the pointer of the currently active block; and DATAITMN pointing to the next active block in the list. If DATAITML is=−1, then DATAITEM points to the first active block. If DATAITMN=−1, then DATAITEM points to the last active block. If DATAITEM=−1, then the algorithm has moved past the last active block or there are no active blocks at all.

1. enter NEXTBLK (DATAITEM,DATAITMN,DATAITML)
2. DATAITML=LNKL
3. DATAITEM=LNK
4. DATAITMN=LNK
5. return
6. end The MERGEBLK merges two block definitions. This involves setting the merged RHB from the right hand active block, and setting the TOP scan value from the "tallest" active block. The total black pel count is the total of the block for both blocks. Finally, the block for the "second" block is released since it is no longer needed.

1. enter MERGEBLK (DATAITEM,DATAITMN)
2. RHB=RHBN
3. IF TOPN :lt: TOP THEN TOP=TOPN FIN
4. ACC=ACC+ACCN 5. LNK=LNKN
6. call DELETE (DATAITMN)
7. DATAITMN=LNK
b 8. return
9. end The CLOSEBLK subroutine converts the data item entries of completed blocks in the DATAITEM linked list into data item entries in the FIGURE linked list. The FIGURE linked list is used in the recognition procedure to generate a new template or to delineate a recognized figure as explained below in detail. The CLOSEBLK subroutine calls the NUBLK subroutine.

CLOSEBLK eliminates from further consideration blocks which do not fit the criteria given above for blocks to be recognized, i.e., greater than 4 in height and width and less than 30 pels in height and width.

TABLE II
Organization of FIGURE

| WORD | CONTENTS | MNEMONIC |
|---|---|---|
| 0 | End-of-scan flag (=X'FFFF' in last item) | ESF |
| 1 | Reserved | WDU |
| 2 | Right-hand boundary pel number | RHP |
| 3 | Bottom boundary scan number | BTM |
| 4 | Reserved | WDD |
| 5 | Height in pels | HGT |
| 6 | Width in pels | WDT |
| 7 | Total number of black pels in figure | TOT |

1. enter CLOSEBLK (DATAITEM,DATAITML,)STRTBLKS,I)
2. field FIGURE (ESF,WDU,RHP,BTM,WDD,HGT,WDT,TOT)
3. CALL NUBLK (FIGURE)
4. ESF = WDU = WDD = 0
5. RHP = RHB
6. BTM = I
7. HGT = TOP-I
8. WDT = RHB - LHB
9. TOT = ACC
10. IF DATAITML :#: −1
11. THEN LNKL = LNK
12. ELSE STRTBLKS = LNK FIN
13. TEMP = LNK
14. call DELETE (DATAITEM)
15. DATAITEM = TEMP
16. IF (HGT :ge: 4)&(WDT :ge: 4)&(HGT :le: 30)&(WDT :le: 30)&(TOT :ge: 4) THEN
17. call NUBLK (FIGURE)
18. FIN
19. return
20. end INSRTBLK inserts a new block in the list of current active blocks. On exit, DATAITML points to the inserted block.
1. enter INSRTBLK (DATAITEM,DATAITML,STRTBLKS,BGN,END,I,PLCNT)
2. call NUBLK (TEMP)
3. IF DATAITML :=: −1
4. THEN STRTBLKS=TEMP
5. ELSE LNKL=TEMP FIN
6. DATAITML=TEMP
7. LNKL=DATAITEM
8. LHBL=BGN
9. RHBL=END
10. TOPL=I
11. ACCL=PLCNT
12. return
13. end The subroutines NUBLK, INSERT, DELETE, and AVAIL are not shown in detail because they are well known in the art for managing linked lists. (See, for example, E. Horowitz and S. Sahni, *Fundamentals of Data Structures*, Computer Science Press: California (1976), pp. 106-202.) AVAIL is a routine or collection of routines that keep track of the available data items available for use. INSERT is a routine that adds a data item to a linked list, using AVAIL to determine its position. (See p. 111, op. cit.) DELETE removes a data item from the list and returns the unused position to AVAIL. (See p. 114, op. cit.) NUBLK merely prepares the data item in the proper form for insertion.

Figure 3:
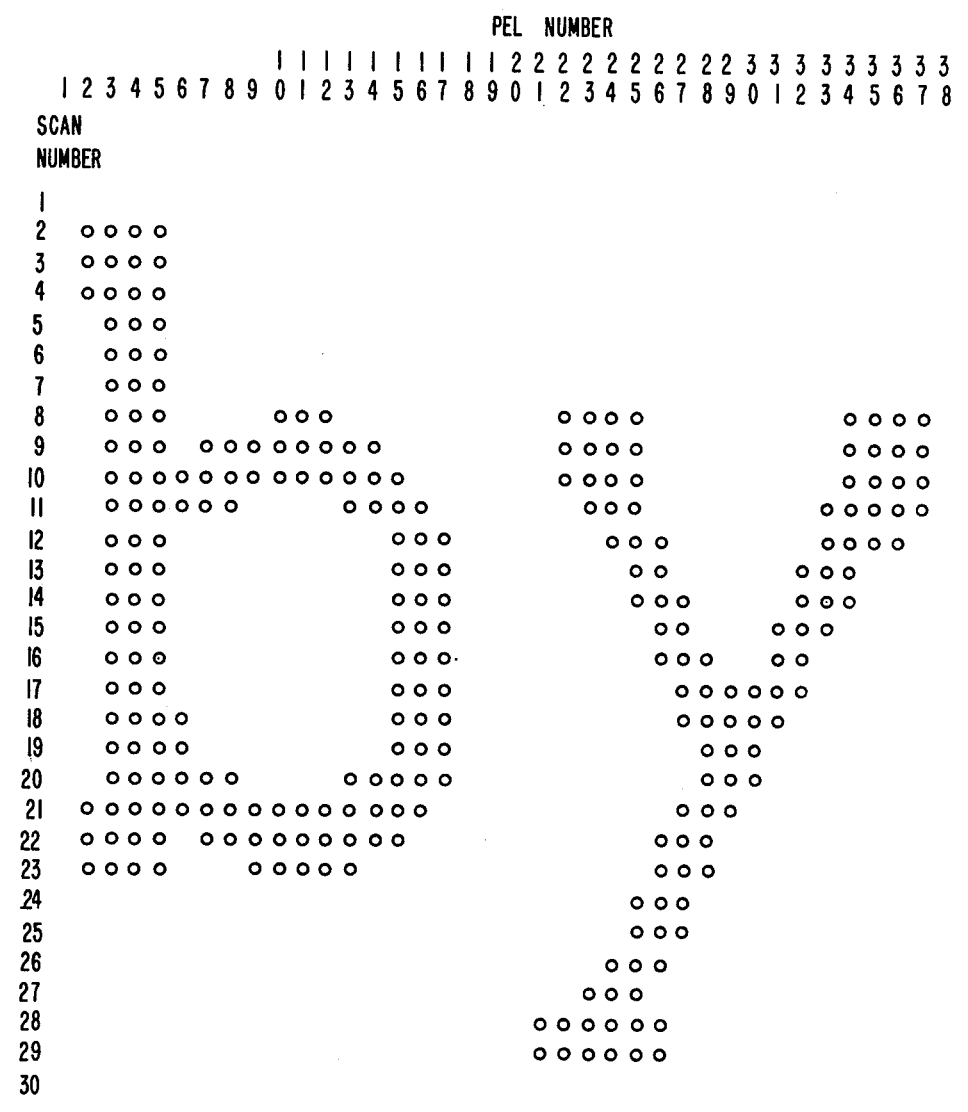

The detailed explanation of the segmentation procedure using the above subroutines will be explained in conjunction with FIG. 3 which illustrates the storage of the scanned word "by" in the scan memory. For clarity and brevity, a scan memory of 30 rows and 38 columns is used for purposes of explanation, and the black pels, which would be represented by a logical 1 in the memory, are shown as in circles. The white pels, represented by logical 0, are not shown.

The subroutine SEGMENT begins its analysis of the scan memory by horizontally scanning the memory locations from scan number 1 and pel number 1. The first scan across the pel numbers detects only white pels. Therefore, the CASE statement (step 7) is ignored because this situation is not one of the listed conditions. Since USEDFLAG was never set and the active block list is empty, NEXTBLK and CLOSEBLK are never called and SEGMENT proceeds to the second scan.

A black pel at column 2 with flag1 reset is the first condition in the CASE statement (step 7) so the program sets flag1, sets the BGN variable to the column number (in this case 2), and increments the pel counter (PLCNT). The next three columns contain black pels so the second condition of the CASE statement is found to be true for scans of columns 3-5, causing the pel counter to be incremented. At the fifth column, the white pel (logical zero) invokes the third condition of the CASE statement which resets flag1.

The BLOCK subroutine is entered with BGN=1, END=5, and PLCNT=4. Since DATAITEM=−1, indicates that there are no active blocks, INSRTBLK is called to insert a block into the active list. Since this is the first active block, STRTBLKS is set to point to this block. This new block becomes the last block processed with DATAITEM still =−1, now indicating it is pointing to the end of the list. Also in INSRTBLK, LHB is set to BGN, RHB is END (which=BGN+PLCNT), TOP is the row number just scanned, i.e., I, and ACC is set to PLCNT. The LNK value is supplied by the subroutine AVAIL.

When the new block is created and inserted in the list, the "return" statements bring the program control back to the SEGMENT subroutine which then scans the next (third) row. Again, a black pel run of four is found beginning at column 2. When the BLOCK subroutine is entered, the first block is now active and the program takes all the "else" branches since the black run falls within the current block but does not have a block to potentially merge with. Since LHB and BGN are the same, the only change effected by this execution of BLOCK is to add the number of black pels to the accumulated number (done by UPDATBLK).

The above sequence continues for the scanning of rows 4 through 7. Because the BGN value is 3 for rows 5 through 7, the same path as taken above is invoked in the BLOCK subroutine which merely adds the number of pels detected to the accumulated number. Since the left-hand boundary is to the left, i.e., less than the beginning of the run, LHB is not changed.

At row (scan) eight, the same sequence is followed as above for columns one through four. At column (pel number) 10, another run of black pels is encountered. When BLOCK is invoked, it is found that the value of END, i.e., END=10, is greater than the right-hand boundary of the first block, i.e., RHB=4. Therefore, the next block is examined (with the NEXTBLK subroutine call) and found not to be active. INSRTBLK is therefore called to create a new block for the pel run from pel number nine to eleven.

Two more blocks are generated by the top of the letter "y". At the end of the scan of the eighth row, there will be four active blocks. These four blocks will be augmented by the scan of the ninth row. The left-hand and right-hand boundaries of the second block will be changed from 10 and 12 to 7 and 14, respectively.

During the scan of row ten, a black pel run of thirteen beginning at pel number 2 will be detected. This run is found to overlap two blocks by the third IF of the BLOCK subroutine. This subroutine is called to merge the definitions of the two blocks. This includes including the right hand pel of the right block and the left hand pel to the left block in the composite.

Also, the top is set from the highest top of the two blocks. The total number of pels in both blocks are combined. The second block is then removed from the list by calling DELETE. This does not complete the processing of this black pel run. The next loop of BLOCK calls UPDATBLK adding this run's information to the newly merged block.

Note that steps 6 and 7 will close a block by calling CLOSEBLK if is has reached the maximum size constraints. Then the closed block, which has been transferred to another linked list as will be later described in more detail is deleted.

Scanning row 11 will detect that the first two pel runs are part of the first block. These runs will be recognized as parts of the same block by the IF tests at statements 4, 6, and 11 of the BLOCK subroutine. The UPDATBLK subroutine will adjust the right-hand boundary of the block.

After the scan of row 17, the BLOCK subroutine will recognize that the third and fourth blocks are to be merged into the third block and call MERGEBLK in the manner described above.

When row 24 has been scanned, the BLOCK subroutine will determine that the first block was not updated, and the first black run begins to the right of the end of the block. Therefore, the first block will be closed by step 9 of the subroutine.

The third block (now the only active block) will continue to be augmented until the scan of row 30. Since no black pels will be detected during the scan of row 30 in the example, SEGMENT never calls BLOCK at the end of the scan. Therefore, the CLOSEBLK subroutine will be called for all remaining active blocks—in this case, the only active block—will be closed.

The illustrative scan is now completed. As a result, the FIGURE linked list will have two entries corresponding to the two letters "b" and "y". They will be represented in the FIGURE linked list by right-hand boundary pel numbers of 17 and 37, bottom boundary scan numbers 24 and 30, heights of 22 pels, widths of 16 and 17 pels, and totals of 161 and 108 pels, respectively.

The video memory is actually continually being updated by the document scanner in a wrap-around fashion, i.e., after the bottom row is filled, the updating starts again at the top row. The segmentation procedure proceeds in a similar way, usually some fixed number of rows behind the input as noted above.

RECOGNITION

The recognition procedure compares the figures from the segmentation procedure with templates, stored figures previously segmented. As described above, the figures are arranged as data items in a linked list, FIGURES. It is also assumed that the necessary list management routines are provided as described below.

The processing speed is increased by not correlating each figure with every template. It has been determined empirically that the procedure to be described compares each figure with fewer than half the templates on the average for a typewritten or printed input document.

Figure 4:
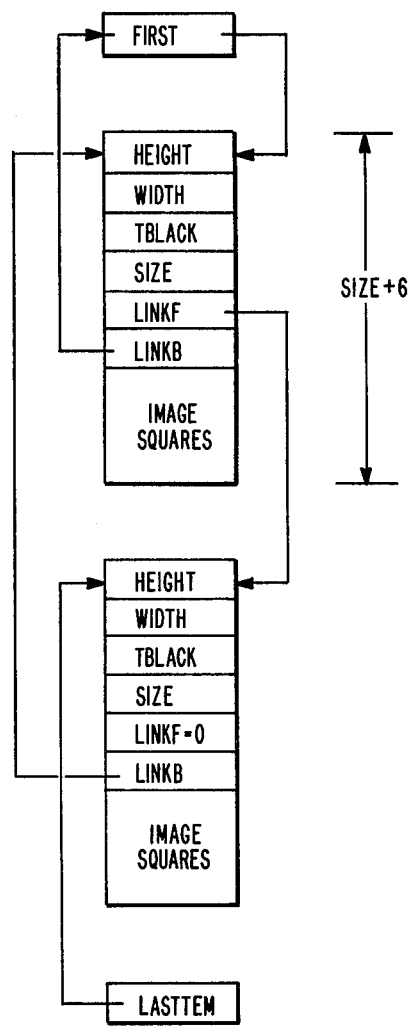
FIG. 4 is a representation of the data items in the TEMLIST.

The template list (TEMLIST) is a double- or two-way linked list. That is, there are link addresses not only to the next data item in the list but also to the previous item in the list. FIG. 4 is an illustration of the linked list used in an implementation of the invention. This double-linked list, TEMLIST, has its first data item located by FIRST as described for F in the segmentation procedure.

Comparison of figures with templates is made in the order of frequency and recentness of recognition. The comparison ends when a match is found or when the last template has been processed. In the latter case, the figure becomes a new template.

The list positions, which enable the receiver to find a recognized figure, are preferably encoded using a variable length code. This reduces the average length of the position (identifier) code words.

Figure 5:
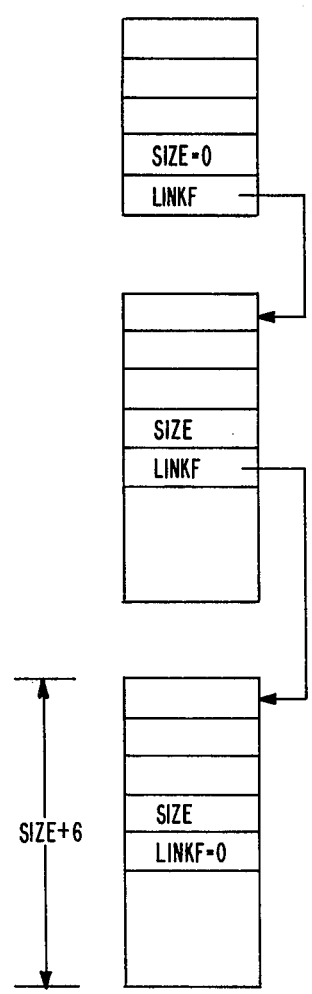
FIG. 5 is a representation of the data items in AVAIL.

FIG. 5 illustrates the AVAIL linked list which is used to maintain a list of available data items. The portion of memory not in the TEMLIST is held by the elements of the one-way linked AVAIL list. The two lists together account for every (16-bit) word of the template memory. A particular word may be available at one time and be part of the TEMLIST at other times. When the template memory is cleared at the start of a page, when using no preset font, the entire memory becomes one element on the AVAIL list, and the TEMLIST is empty. Each list has a pointer to the first element which is set to zero to indicate the end of the list. The list structure for the TEMLIST has the following advantages:

1. Fast forward search is possible. Progression from one template to the next in the desired order is accomplished merely by loading the forward link, LINKF in FIG. 4, of the current template. This may be done thousands of times per page.

2. Simple promotion and entry of data items is possible. When a template is matched, it can be moved from its position in the list and promoted to the top or beginning. A new template also enters at the top of the list. These operations involve the manipulation of a few pointers, not the time-consuming movement of data or tables of addresses.

3. Variable element size is possible. The data portion of each TEMLIST element is only as large as necessary to hold the corresponding template. Almost every word of the template memory can be used before discarding any templates, as opposed to reserving space, e.g., for one hundred maximum-sized templates at fixed locations.

4. Continuing storage management is possible. When the template memory first overflows, i.e., when the AVAIL list is reduced to a single element too small for a new template awaiting storage space, additional space can be made available by removing the least recently used template at the bottom of the TEMLIST. Generally, several elements are on the AVAIL list, which is searched to find space for new templates as they are found. At no time is it necessary to to sto and to clean up the memory by consolidating the used and unused portions.

The recognition logic uses two procedures to manipulate the structure portion of the linked lists: RESERVE and PROMOTE. The decoding procedure of a receiving machine uses these procedures in exactly the same way, calling RESERVE for each new template definition and PROMOTE each time a recognized template is indicated. Both recognition and decode procedures write new template data at an address in the template memory returned by RESERVE, thus assuring that sender and receiver have the same TEMLIST at all times.

The RESERVE procedure searches the AVAIL list, taking the first data item that is at least as large as the requested amount of data storage. (If the element is much larger than needed, it can be dichotomized into a reserved portion and a smaller available portion.) If no such data item exists, RESERVE invokes LIBERATE, a routine which returns previously reserved elements to the AVAIL list, one or more times, until a large enough free element exists. LIBERATE links the unwanted data item into the AVAIL list, keeping it sorted by location. Thus, if the unwanted data item is contiguous with the available one before or after it (or both), they can be collapsed into one larger available element. The last entry on the template list, which is located by pointer LASTTEM (FIG. 4), is always the next candidate for liberation. Another pointer, called ROVER, is employed to help speed the searches performed by RESERVE and LIBERATE. These procedures exhibit reduced average search length if they start at the available block after the last one reserved rather than at the head of the AVAIL list. This also prevents such problems as the accumulation of smaller free blocks at the lower addresses and large blocks at the high end of memory. Such a system of dynamic storage allocation is a combination of methods well known in computer science. (See, e.g., D. Knuth, *The Art of Computer Programming*, Vol. 1, Addison-Wesley Publishing Co.; Reading, Mass. (1973), pp. 435–457.)

The PROMOTE procedure is straightforward. PROMOTE is invoked when an input figure matches a TEMLIST element and moves that element to the top of the list. The selected element is bypassed or unlinked from the interior of the list and inserted or re-linked as the first element of the list. To accomplish this, six pointers are updated: the forward link of the element before the selected one, the backward link of the one after, the forward and backward links of the selected element, the backward link of the former first element, and finally the pointer called FIRST.

Good list management improves the probability of an early match, but it is also desirable to determine as rapidly as possible that there is no match. Advancing to the next template in case of no match is the most frequently occurring action in the procedure. The comparison is divided into several steps, the first steps being those most likely to indicate a match failure.

Figure 6:
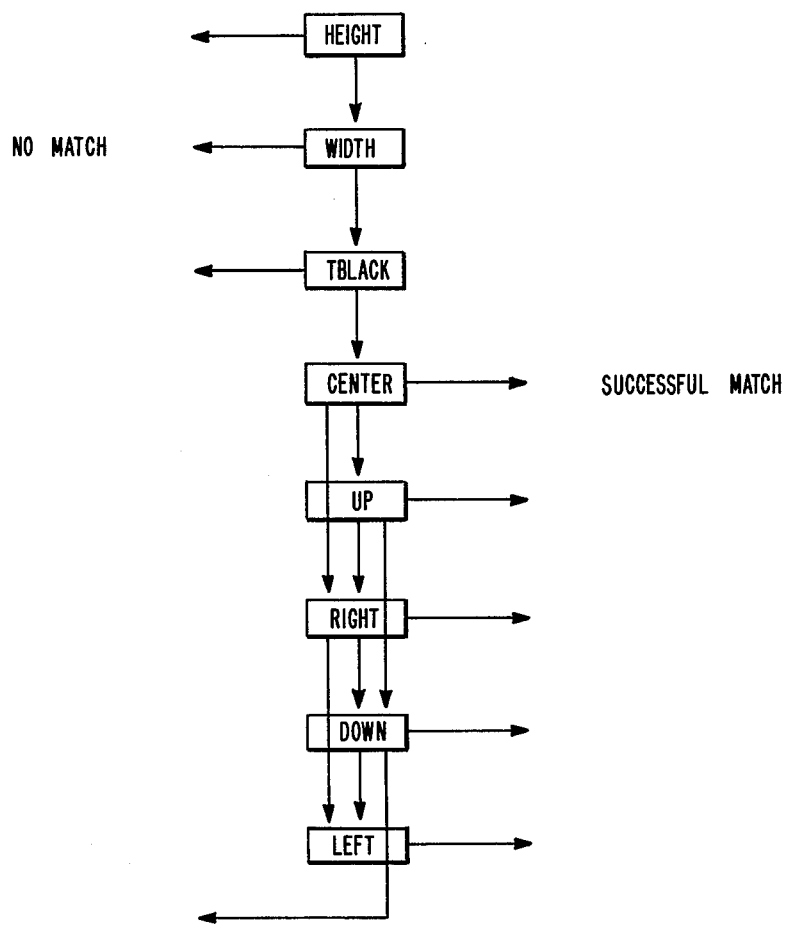
FIG. 6 is a flowchart of the matching process used in the recognition procedure.

FIG. 6 is an illustration of the matching procedure. Each box represents the comparison of some property of the figure and template. Arrows to the left represent a match failure and arrows to the right, a successful match. The first three tests compare descriptions of the figure and template, not the binary images themselves. The remaining tests comprise image comparison at up to five registrations. A failure at the initial registration moves the template up with respect to the input, for example. The lines drawn through these boxes represent skipped registrations.

The first test, the most likely to fail, compares the heights of the figure and template. If the absolute value of the difference is greater than two, the current template is abandoned. Otherwise, the width is compared in the same way. The third test compares the total number of black pels in the two. This fails if the absolute value of the difference is greater than one tenth the sum. (The thresholds can be adjusted to optimize speed and accuracy for a changing mix of input documents.) Image correlation is next tested if the above three tests are passed.

Figure 7:
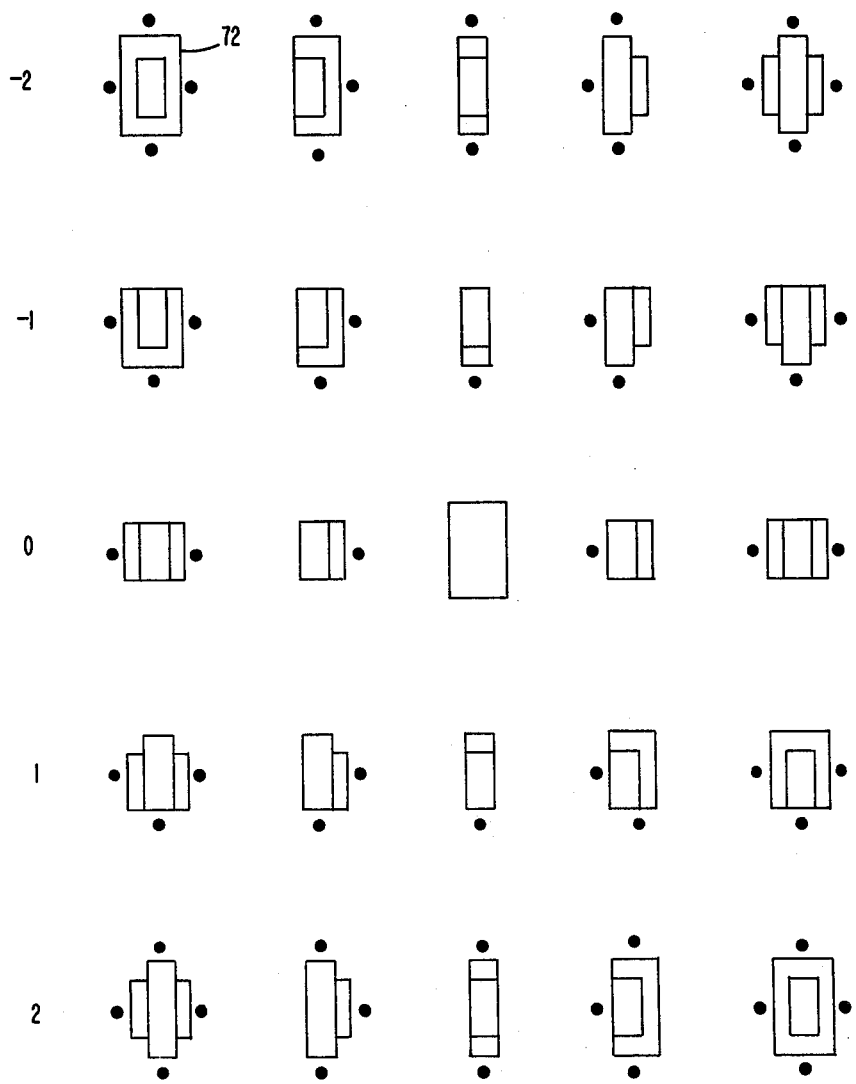
FIG. 7 is an illustration of different placements of templates over figures.

With a size tolerance of two, the template under consideration may be one or two pels taller or shorter, as well as wider or narrower, than the figure. The template is superimposed on the input where it lies in the scan memory, and may be moved up, right, down, and left. In some registrations, however, the two figures overlap by two pels. These registrations are skipped on the premise that the chance of a match is minimal. FIG. 7 illustrates all the possible combinations of sizes and shows, for each case, the placement of the template for central registration. It also indicates which registrations are skipped. The pels in a one pel-wide strip around the figure may be compared to pels within the template for some registrations and sizes. Similarly, the pels in a one pel-wide strip just within the figure may be ignored in some comparisons. Because overlapping has a greater effect on smaller figures, re-registration is prohibited for narrow (left and right moves) and short figures (up and down moves). In FIG. 7, the figure overlays the template in the first two columns and the first two rows of the third column. In the remaining diagrams, the template overlays the figure. The dots indicate that the template is not to be moved in the corresponding direction.

The central rectangle 71 represents the condition where the template and the figure are the same size. The absence of dots at its boundaries indicates that it is permissible to shift the template, in case there is no match in the centered position, in any direction—left, right, up, or down. No combination of shifts is permitted. Therefore, in case of no match, the template and the figure would be compared a maximum of five times in the situation where the template and the figure are the same dimensions. That is, centered, the template shifted one row up, one row down, one column left, or one column right.

The numbers at the top of the columns represent the difference of the figure width minus the template width. Therefore, the −2 column indicates that the template is the wider rectangle and the figure is shown as overlaying the figure rectangle.

The numbers at the left of each column represent the difference obtained by subtracting the template height from the figure height. Therefore, in the first two columns and the first two rows of the third column, the figure is shown overlaying the template. In the last two columns and the bottom two rows of the middle column, the template overlays the figure.

Where the difference are both −2, diagram 72 shows that no shifting is permissible, i.e., the dots indicate that the template is not to be shifted in the indicated direction. Therefore, if there is no match in the centered position when the absolute values of the differences are two, then it is concluded that there can be no match by shifting and the recognition procedure recognizes it as a mismatch.

Figure 8:
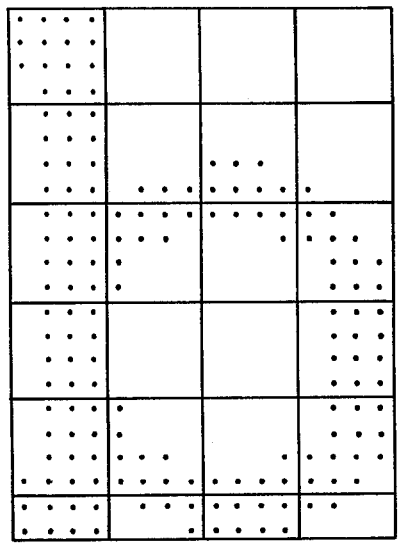
FIGS. 8a–8d are illustrations of the comparison of a template and a nonmatching figure.
Figure 8:
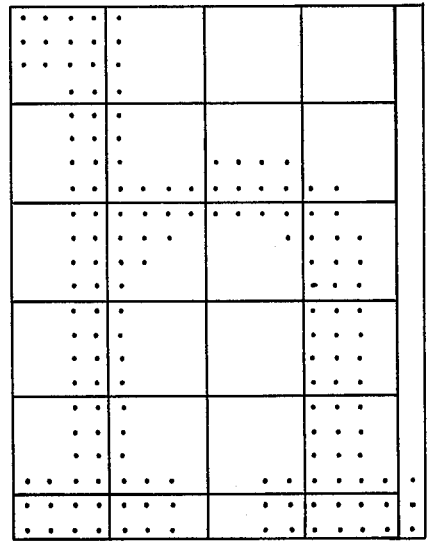
Figure 8:
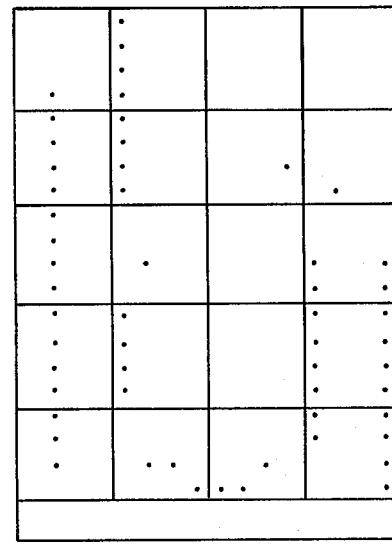
Figure 8:
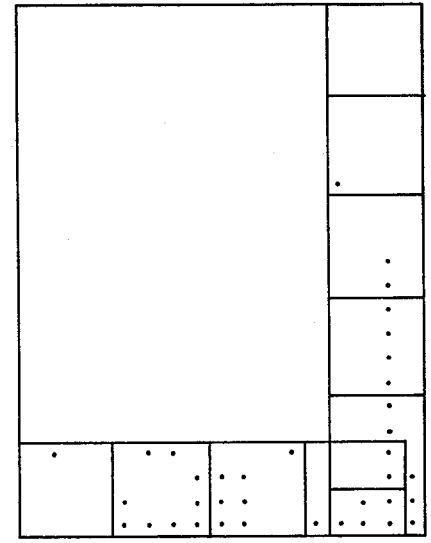

The criterion for matching is based on dividing the figure and template into small, e.g., 4×4 pel, squares, and comparing these one at a time. This grid of squares stays with the template as it moves to a new registration. FIG. 8 is an example of the comparison of a "b" figure with an "h" template, showing the 4×4 grid associated with the template. When the height or width is not a multiple of four, all the whole squares that will fit in the template rectangle are used, starting from the upper left and also whole squares aligned with the bottom or right edge. The number of unequal pels in each square of the grid is counted in turn, and the match fails when any square's count exceeds a threshold. (This threshold is a function of the total black pel count in both input and template.) Typically, only two of three squares need to be considered for the average of all figure comparisons on a document, most of which are failures. For every successful match, all squares of the template grid are compared. In the example of FIG. 8, up to four unequal pels were allowed in any 4×4 square. Therefore, after finding one bit unequal in square 1 (upper left 8c), the comparison proceeded to count four in square 2 (row 1, column 2 of 8c) and so on. In square 16 (row 4, column 4 of 8c), a count of eight caused the match to fail. The 13 remaining squares were not considered.

In FIG. 8a, a pel image for the letter b is shown. FIG. 8b is the template for the letter h. FIG. 8c represents the pels that are not common to the two letters in the internal squares, and FIG. 8d, in the border squares.

In one implementation, a basic operation of the recognition procedure is the reading of a 4×4 square from the scan memory. A new template is extracted in this way, writing these squares as 16 bit words into the template memory, image squares in FIG. 4, in the order indicated in FIG. 8. The basic comparison operation then consists of reading a 4×4 square from the scan memory, reading a 16-bit word from template memory, and comparing to some threshold the count of one bits resulting from the exclusive ORing of the two 16-bit words.

When a match is found at some registration other than the initial one, it is desirable to adjust the position of the inserted identifying code so that the receiving machine will print the matching template in the most appropriate position. This adjustment is performed horizontally, but cannot move the insertion point up or down because that they may cause the decoder to receive the figures in a different order from that in which they were considered by recognition.

In one implementation, there was an occasional substitution of a template "c" for a figure "o", which was prevented by decreasing the error threshold by one for the rightmost column of 4×4 squares whenever the template was narrower than the input figure. This modification eliminated almost all of the problem substitutions with minimal impact on overall recognition performance.

The program details for performing the recognition procedure will be described. In FIG. 2, it is illustrated that the MAIN program calls the RECOG subroutine which controls the recognition procedure. The RECOG subroutine calls the TEST subroutine to determine whether the figure from the segmentation procedure matches any of the templates in the TEMLIST. If the figure matches a template, the ERASE subroutine is invoked to erase the figure from the video buffer before the compression routine encodes the video buffer data. If there is a match, RECOG calls PROMOTE to move the matched template to the beginning of the list. As previously discussed above with relation to linked lists, this requires only the changing of link values in the data items of the linked lists. Therefore, the PROMOTE subroutine need not be described in detail; it is well known in the art.

If there is no match, then the RECOG subroutine invokes a NEWTEM subroutine to insert the figure at the beginning of the template linked list. The figure is not erased from the video buffer, however. Both the MATCH and NEWTEM subroutines call the GETF subroutine, which extracts from the video memory the pels values corresponding to the squares as illustrated and explained in connection with FIG. 8. That is, the squares of the template are stored as image squares (IMSQ) and comprise a single 16-bit word each. The pel values of the figure, on the other hand, are stored in the video memory in the order in which they were scanned. Therefore, for comparison and template storage purposes, the figure must be extracted as 16-bit words representing the 16-bit squares of FIG. 8 in the correct order. The order of squares is by columns starting at the left. The order of pel search within a square is by row starting at the top.

The TEST subroutine calls the MATCH subroutine which determines the number of pels which are not common to both the figure and template squares.

The PROMOTE subroutine invokes (if necessary) the LIBERATE subroutine and the AVAIL subroutine described in detail in the segmentation procedure. The LIBERATE subroutine is well known in the art and need not be described in detail for an understanding of the invention.

The following is the RECOG subroutine.

1. enter RECOG
2. field TEM(THT,TWD,TBL,TSZ,LKF,LKB,array IMSQ (1,TSZ-6)); FIG(ESF,WDU,RHB,BTM,WDD,HGT,WDT, TOT)
3. NEXT = FIRST
4. TEM = (NEXT); NEXT = LKF
5. IF abs(HGT−THT) :gt: 2 v abs(WDT−TWD) :gt: 2 v abs(TBL−TOT) :gt: (TBL + TOT)/10)
6. THEN (8) FIN
7. call TEST
8. IF TID THEN call ERASE; call PROMOTE; return FIN
9. IF NEXT :#: 0 THEN (4)
10. call NEWTEM
11. return
12. end Step 2 sets up the data items from the TEMLIST template linked list and specifies the figure variables.

These have already been explained in the above description.

Steps 3 and 4 perform the functions to step through the TEMLIST.

Step 5 compares the height and width parameters and the total number of black pels in each to determine whether there is a close enough match to attempt to fit the rest of the template. That is, if the absolute values of the differences in height or width exceed two or if the difference between the number of black pels exceeds one-tenth their sum, the next template is examined.

Step 7 invokes the TEST subroutine to compare the image squares of the input figure to the current template. If the test is successful, it is indicated by TID being true and the subroutines ERASE and PROMOTE are called. RECOG then returns control to the main program until a new figure is ready to be identified.

Step 10 is reached only if the procedure advances to the end of the TEMLIST without a successful match. The NEWTEM subroutine moves the parameters of the figure into the corresponding data item positions of a TEMLIST data item and then, using the GETF subroutine, constructs an image squares array from the figure.

1. enter NEWTEM(FIG;TEM)
2. THT=HGT; TWD=WDT
3. n=MOV=0
4. FHT=HGT; FWD=WDT−MOV
5. IF FWD :lt: 4 THEN FWD=4 FIN
6. ((F))=(BTM−FHT−1)*1728+RHB−FWD−1
7. call GETF (((F));F)
8. (+1)n; IMSQ(n)=F
9. (−4)FHT
10. IF FHT :ge: 4 THEN (6) FIN
11. IF FHT :#: 0 THEN FHT=4; (6) FIN
12. IF FWD :#: 4 THEN (+4)MOV; (4) FIN
13. TSZ=n
14. call PROMOTE
15. return
16. end The variables FHT and FWD are used to step through the addresses in the correct manner to extract the bits corresponding to the image squares. The address of the figure, designated by ((F)), is found by adding 1728 times the difference between the bottom boundary scan number (BTM) and the figure height to the right-hand boundary pel number minus the width. The value of 1728 is the number of locations in a row of the video memory. When the address of F points to the upper left-hand pel, the pels are extracted by GETF subroutine.

The video memory diagram, FIG. 9, shows how the above finds the beginning of the figure. The memory cells are shown with their (decimal) address. The contents of only the figure are of interest. Assuming that the scan row 5 is all zeros, the figure is described by HGT =5, WDT=6, TOT=24, RHB=8 and BTM=11.
((F))=(BTM−HGT−1)*1728+RHB−WDT−1 becomes ((F))=(11−5−1)*1728+8−6−1=8641.

The GETF subroutine uses the address to extract the pel bits.

| 1. | enter GETF (((F)); F) |
| 2. | F = e(16)' |
| 3. | FOR j = 1 TO 4 |
| 4. | FOR i = 1 TO 4 |
| 5. | IF (((F))) :=: 1 |
| 6. | THEN F = F v e(17-i*j,16)' FIN |
| 7. | (+1)((F)) |
| 8. | NEXT i |
| 9. | (−4)((F));(+1728)((F)) |
| 10. | NEXT j |
| 11. | return |
| 12. | end |

Beginning at address 8641, the subroutine checks for a logical one stored value. Since the contents of 8641 are 1, the program generates a vector of zeros having a one at 17-i*j, which since i=j=1 equals 16, F has been initialized to all zeros so 0 0 0 0 0 0 0 0 0 0 0 0 0 0 0 0 is ORed with 1 0 0 0 0 0 0 0 0 0 0 0 0 0 0 0.

At step 7, the address is incremented by one to 8642. A one value is also found at the address and vector e(17−i*j, 16), which is e(17−2*1,16) produces 0 1 0 0 0 0 0 0 0 0 0 0 0 0 0 0. After ORing with F, F is 1 1 0 0 0 0 0 0 0 0 0 0 0 0 0 0.

The address is again incremented, and upon addressing 8643, finds a zero value. Therefore, no OR operation is performed and the program loops for X=3 with the address 8644 which stores a one value. F then is modified to 1 1 0 1 0 0 0 0 0 0 0 0 0 0 0 0.

After this loop, however, the values of i are exhausted. The address, which has been incremented to 8645 is decremented by 4 to 8641 and a value of 1728 is added, producing an address of 10369. The program loops on i from 1 to 4 but this time with j=2. The program loop is performed four times to modify F to 1 1 0 1 1 1 1 1 0 0 0 0 0 0 0 0. The address is then modified to 12097 and the process continues. When the subroutine has completed sixteen loops, four i values for each of four j values, F is 1 1 0 1 1 1 1 1 1 1 1 1 0 1 1 1 which represents the square designated by addresses 8641 to 8644, 10369 to 10372, 12097 to 12100, and 13825 to 13828.

The returned value of F is the first word in the image square array of the template. That is, IMSQ(1)=F, in step 8 of NEWTEM.

Before GETF is called again, the value of FHT, used as a modifiable HGT variable is examined to determine whether it is less than 4. If it is not, it is decremented by four in step 9 and the extraction process is repeated as described in detail above but four scan lines lower. Therefore, the second square will be extracted and stored as the second word in the image square array.

If the value of FHT will be less than four, then it is replaced by four and the process of extraction by GETF is repeated. This will cause a bottom square that overlaps the previous square to be stored. This is illustrated in FIG. 8. The height of the template in FIG. 8(a) is not evenly divisible by four. Therefore, an extra block per column is stored as an image square. These are outlined in FIG. 8(d) and will be discussed in connection with the testing procedure. The same squaring off process is used at the last column if the number of columns is not divisible by four. This is handled as illustrated in NEWTEM steps 9 through 13 and step 5.

The TEST subroutine, using the subroutines MATCH and CKSIZE, attempts to match the figure in up to five different registrations as described above.

1. enter TEST
2. THRESH=4
3. IF (TBL+TOT) :le: 24 THEN (−1) THRESH FIN

4. IF (TBL+TOT) :gt: 120 THEN (+1) THRESH FIN
5. TID=1
6. call CKSIZE
7. call MATCH
8. IF M THEN return FIN
9. (−1) DELTAY
10. IF SKPU' THEN call MATCH; IF M THEN return FIN FIN
11. (+1)DELTAY; (+1)DELTAX
12. IF SKPR' THEN call MATCH; IF M THEN return FIN FIN
13. (+1)DELTAY; (−1)DELTAX
14. IF SKPD' THEN call MATCH; IF M THEN return FIN FIN
15. (−1)DELTAY; (−1)DELTAX.
16. IF SKPL' THEN call MATCH; IF M THEN return FIN FIN
17. TID=0; return
18. end Steps 2, 3, and 4 establish the threshold to be used by the MATCH subroutine in comparing the image squares based on the total number of black pels in the template and image figures.

Step 6 calls the CKSIZE subroutine to adjust the initial, i.e., center registration and determine which, if any, of the other four registrations should be skipped.

Step 7 calls the MATCH subroutine to perform the square-by-square comparison and returns a value of M=1 if there is a match. If the match is successful, the subroutine TEST returns to the calling program with TID=1 to indicate that a template has been identified (matched).

Step 9 adjusts the starting point for the "up" registration. Step 10 then determines whether the up registration should be skipped as determined by the CKSIZE subroutine. If it is, MATCH is called with M=1 indicating a successful match.

Steps 11, 13, and 15 perform the other registration tests in the same way.

Step 17 resets TID and returns to the calling program to indicate by TID=0 that no match was successfully made.

1. enter CKSIZE
2. DELTAY=DELTAX=0
3. SKPU=SKPD=SKPL=SKPR=0
4. DHT=HGT−THT; DWD=WDT−TWD
5. IF DHT=0 THEN (12) FIN
6. IF DHT :lt: 0 THEN (10) FIN
7. SKPD=1
8. IF DHT=−2 THEN SKPU=1; DELTAY=−1 FIN
9. (12)
10. SKPD=1; DELTAY=1
11. IF DHT=2 THEN SKPU=1 FIN
12. IF DWD=0 THEN return FIN
13. IF DWD :gt: 0 THEN (17) FIN
14. SKPL=1; DELTAX=−1
15. IF DWD=−2 THEN SKPR=1 FIN
16. return
17. SKPR=1; DELTAX=1
18. IF DWD=2 THEN SKPL=1 FIN
19. return
20. end Steps 8, 10, 14, and 17 cause the corresponding registration match to be skipped if the image is too tall, too short, too wide, or too narrow, respectively.

1. enter MATCH
2. n=MOV=0
3. FHT=THT+DELTAY; FWD=TWD+DELTAY−MOV
4. IF FWD :lt: 4 THEN FWD=4 FIN
5. ((F))=(BTM−FHT−1)*1728−RHB−FWD−1
6. call GETF(((F));F)
7. (+1)n; T=IMSQ(n)
8. X=0
9. FOR i=1 TO 16
10. IF F(i) ⓡ T(i) THEN (+1)X FIN
11. NEXT i (9)
12. IF X :gt: THRESH THEN M=0; return FIN
13. (−4) FHT
14. IF FHT :ge: 4 THEN (5) FIN
15. IF FHT :#: 0 THEN FHT=4; (5) FIN
16. IF FWD :#: 4 THEN (+4) MOV; (3) FIN
17. M=1; return
18. end If TID is true, i.e., equal to one, when program control returns to RECOG from TEST, a subroutine ERASE is called. This subroutine calculates the address of the upper left corner of the matched figure and, using the height and width in pels, erases the figure by clearing each memory location to a value of zero. The calculation of the address was described above.

1. enter ERASE
2. TOP=BTM−HGT; LHB=RHB−WDT
3. A=(TOP−1)*1728+RHB
4. FOR i=0 to HGT
5. FOR j=0 to WDT
6. ((A+i*1728+j))=0
7. NEXT j (5)
8. NEXT i (4)
9. return
10. end The main program continues to call the subroutine RECOG until all the figures in FIGLIST have been tested. After checking all the figures and erasing those which have matched a template, a residual image remains. This residual image includes unmatched figures and all pel patterns not large enough to constitute a figure. The main program then calls the subroutine ENCODE to complete the third phase of the data compression procedure.

ENCODING

The final step of compressing the data contained in a graphic image is the efficient coding of the residual image and identifying data that is used to identify the templates and figures. In the following explanation, a template figure means a figure that was segmented but which did not substantially match any of the templates in the template list. The term CI stands for coded information and means a figure which has been matched to a template on the template list.

An efficient two-dimensional code is described in "Two-Dimensional Facsimile Coding Scheme," supra, and is the coding procedure that is considered to be used in the following description of the preferred embodiment.

The encoding procedure follows the recognition procedure by a certain number of scan rows, e.g., approximately 30. The procedure uses the entries in the figure list (FIGLIST), i.e., FIGURES, described above and shown in Table II. Figures that have matched a template are passed to the encode procedure by a list giving the scan (row) number, pel number (column), and the position of the corresponding matched template in the template list, TEMLIST.

Figure 10:
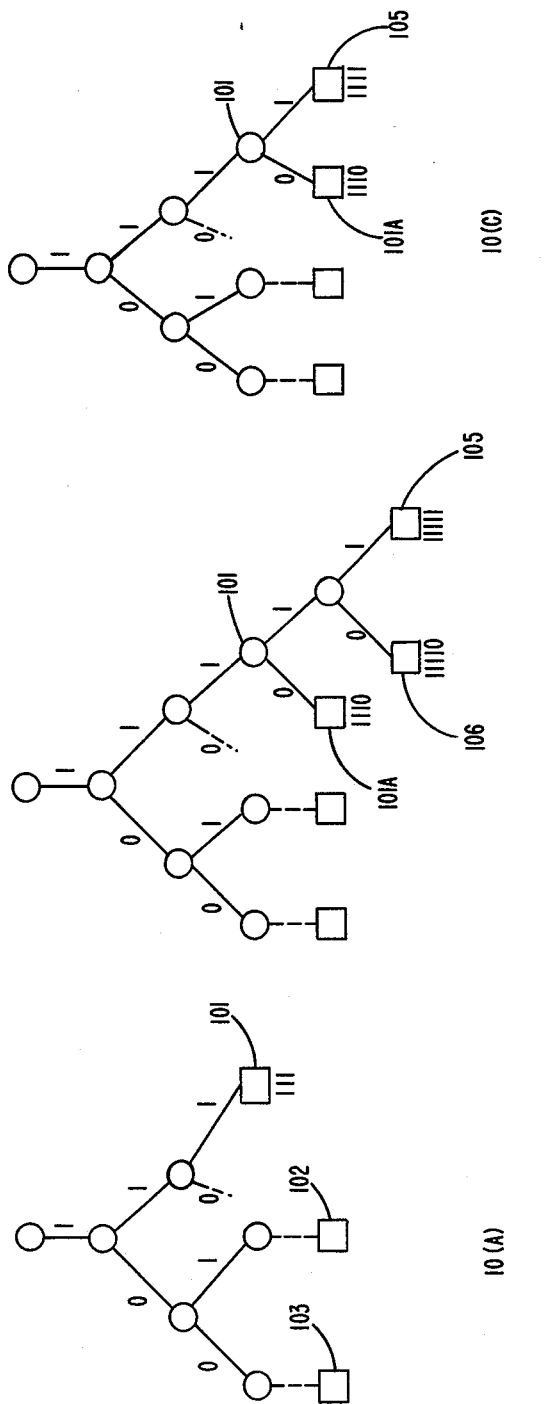
FIGS. 10a–10c are a triplet of tree diagrams illustrating a code modification for use in the invention.

The coding scheme must provide a special code for a CI and for a template figure. FIG. 10(a) is a tree diagram showing part of the prior art code. From an initial node—nodes are shown in circles—the path for a code value of one branches into two paths, one for a second value of zero and another for a second value of one. These paths branch again and, as shown for a third value of one, reach a terminal. Terminals are depicted as squares. The terminal 101 represents the code sequence 111 which can, for example, indicate a black run length of two. The remaining branches eventually reach other terminals, shown generally as terminals 102 and 103.

FIG. 10(b) shows the modification of the code to add two sequences that can be used to identify CI's and figure templates. The terminal 101 is changed to a node, the zero path leading to a terminal 101a and the one path leading to another node. This latter node leads to terminals 105 and 106. Thus, the sequence 1110 now represents a black run length of two. CI and figure templates are represented by 11110 and 11111, respectively. A criteria for choosing the desired codes is that the chosen codes should be as short as possible since they tend to occur often.

When the encoder reaches a given scan number, the FIGURES for that row are made available in order of pel numbers. When the encoding routine reaches a given pel number, the identifying information is inserted. For a CI, the position number on the template list follows the CI identifier. For a figure template, the identifier is followed by a height and width code. The identifier codes can also be made of varying length so that the more frequently occurring values can be assigned shorter codes. The resulting encoded information is transmitted as a bit stream.

At the receiving end, the residual image is reconstructed by decoding the bit stream. When a CI identifier is recognized, the decoder extracts the template from its own list, which is a duplicate of the transmitter's template list because both are generated the same way. The position of the identifier in the bit stream indicates the position at which the retrieved template is inserted. In the embodiment being described, the position of the identifying code in the bit stream represents the lower right-hand corner of the template rectangle. The bit pattern is retrieved from the template list and placed in the graphic image being reconstructed at the receiving end.

If a template figure identifier is recognized, the decoder uses the height and width information which follows to extract the figure from the reconstructed image and adds the new template thus derived to its template list. It does not erase the figure from the reconstructed image.

Initially, both the transmitting and receiving template lists will be empty. As each unmatched figure is extracted at both ends, the template lists will grow and the number of recognized figures will increase. The manner by which the templates are extracted at each end insures that the templates lists are identical so that the templates can be identified by their position in the template lists.

The program required for the encoding and decoding procedures can readily be constructed by one of ordinary skill in the art according to the above explanation. Therefore, the detailed programs are not necessary to an understanding of the invention. FIG. 11 is a flowchart for a program segment that recognizes the identifiers and calls the appropriate subroutine to extract a figure as a template (EXTEMP) or to fill in a CI.

As explained, the template lists are considered to be as long as necessary to hold all the templates that are derived from a graphic image. Practically, some upper bound must be placed on the size of the template lists. As was described above, the TEMLIST can be periodically rearranged to order the list according to frequency of matching each template. This provides several advantages.

A major advantage is that the probability of an early match is increased. Another advantage is that the least used templates are at the end of the list and, when the list is full, the new templates can easily replace the least used ones.

Furthermore, the list position numbers can be encoded with variable length coding to increase compression even more. The same re-arrangement of the templates at the receiving end must be made as are made at the transmitting end. The re-arrangements can be synchronized by the procedure described above, viz., moving the last matched template to the top of the list.

A further improvement in compression can be made by running a segmentation routine at the receiving end. The figure templates would not have to be identified, the segmentation routine at the receiving end removing each figure from the encoded residual image which it recognizes as a template. Using this refinement, only a CI would have to be identified in the data stream. FIG. 10(c) is an illustration of the new coding modification required. That is, the 1110 sequence would still identify the black run length of two but 1111 would now identify a CI location. Running the segmentation routine at the receiving end, however, increases the complexity of the system and requires more processing time.

Still further improvement in the compression ratio can be accomplished by realizing that once a template or figure is identified, the statistical distribution of the following scan differs from that for the rest of the residual image. That is, there is a high probability that the next run will be all white up to another identifier. Therefore, the coding scheme is adapted to take advantage of the fact that a new statistical distribution applies after an identifier is decoded.

The CI inserted code for the improved version comprises CINSERT, CI, and CRUN for the first CI encountered after a white run. (A white run should almost always precede a CI insert as described above because of the way the segmentation procedure operates if, in fact, a black run precedes the CI insert, a white run of zero is required.) Subsequent CI's, separated from preceding CI's by white runs only, are identified by CI and CRUN only. CINSERT is the identifier for CI's, 1110 in the improved described embodiment. CI is the code to identify the template to be inserted, i.e., the TEMLIST position in the described embodiment. CRUN is the number of (white) pels to the next CI identifier. If the CRUN value indicates an escape instead of a run, the next run is encoded in the original two-dimensional scheme. (Escape means a reversion to the original encoding.)

CONCLUSION

A system for compressing facsimile data has been described that segments contiguous pels into figures by enclosing contiguous pels in a rectangle that is just large enough to contain them. The figures thus derived are compared to templates in a template list (TEMLIST).

The comparison procedure begins by comparing height and width attributes, numbers of pels in each, and so on, until a mismatch is found or until the figures are compared pel by pel in subsections. If the figure matches a template, the figure is erased from the graphic image. If the figure does not match any template in the TEMLIST, it is extracted and added to the TEMLIST. The figure, however, remains as part of the residual image.

The TEMLIST can be maintained as a long permanent list but is preferably limited in size and ordered by recentness of matches. This speeds up the matching process, simplifies the replacement procedure when a new template must be added to a full TEMLIST, and permits variable length encoding of the list positions for more efficient compression.

When all matched figures have been erased from the image being processed, the residual image is encoded, usually by a two-dimensional variable-length run-length encoding scheme for most efficient compression. At a point in the data stream (representing the encoded residual image) that corresponds to the position of an erased recognized figure, an identifying code is inserted. The lower right-hand corner is used in the described embodiment. At the same position of figures remaining in the residual image, i.e., unmatched figures, an identifier and the height and width attributes of the figure are encoded.

At the receiving end, the decoder reproduces the residual image. When identifier information is recognized, it is extracted and analyzed. If it represents an erased figure, the identifier code is used to extract the corresponding template from the template list and to insert it in the residual image. If the code represents an unmatched figure, the figure information is extracted from the reconstructed image and added to the receiver's TEMLIST as a new template. The figure remains in the reconstructed image. By constructing both the receive and transmitted template lists in this way, it is apparent that the position of each template is the same in both lists.

Instead of identifying an unmatched figure, the system can run a segmentation routine at the receiving end. If a figure is transmitted in the residual image, the receiving end's segmentation routine will recognize it as a figure and extract it for adding to its TEMLIST. This precludes the necessity for two identifier codes and eliminates identifiers for unerased figures altogether, both factors reducing the amount of the code required and thus increasing compression.

Further improvement is provided by using a different encoding scheme between identifier codes. Figures, matched or unmatched, will tend to occur in contiguous groups with the intervening runs having a different statistical distribution from that of the rest of the residual images.

While the invention has been particularly shown and described with reference to a preferred embodiment thereof, it will be understood by those skilled in the art that the foregoing and other changes in form and details may be made therein without departing from the spirit and scope of the invention.

APPENDIX

Summary Of Typical TYpable Program Integrated Code And Language

Each step
1. comprises one or more lines,
2. is consecutively numbered,
3. may contain more than one statement, if the statements are separated by semicolons,
4. may have a label, and
5. can be merely an unconditional branch designation.

Labels can be used to identify steps (lines) and must
1. extend at least two spaces to the left of the statements,
2. be followed with a colon, and
3. begin with a letter.

Definitions

A constant represents a fixed value.
A variable is the name of a changeable value.
An expression is a constant, variable, or a combination thereof related by operators.
A scalar is a single value.
A vector is a one-dimensional array.
A matrix is a two-dimensional array.
An element is a member of an array and is specified as a subscripted variable.

The operators are

| 1. | Arithmetic | |
|---|---|---|
| | a. addition | + |
| | b. subtraction | − |
| | c. multiplication | * |
| | d. division | / |
| | e. exponentiation | ' |
| | f. exponent of 10 | E |
| | g. exponent of 2 | B |
| | h. exponent of 16 | H |
| 2. | Logical | |
| | a. AND | & |
| | b. OR | v |
| | c. Exclusive-OR | @ |
| | d. NOT | ' |
| 3. | Relational | |
| | a. less than | :lt: |
| | b. less than or equal to | :le: |
| | c. greater than | :gt: |
| | d. greater than or equal to | :ge: |
| | e. equal to | :=: |
| | f. not equal to | :#: |
| | g. equivalence | :eqv: |
| | h. implication | :imp: |

The operation hierarchy is:
1. within parentheses;
2. logical operations in the following order
   a. NOT
   b. AND
   c. Exclusive-OR
   d. OR;
3. relational statements in order of occurrence,
4. arithmetic operations in the following order
   a. exponentiation
   b. multiplication and division
   c. addition and subtraction; and
5. left-to-right order within the preceding categories.

When a logical expression is evaluated for use in an arithmetic expression, it is assigned a value of one if the expression is true and a value of zero if the expression is false.

| Special Symbols: | |
|---|---|
| ( ) | 1. enclosing a step number or label, indicates a branch to the step. |
| | 2. encloses the indices of a declared array or subscripted variable. |

-continued

Special Symbols:

|   |   |
|---|---|
|   | 3. indicates a modification to a following variable or register without changing its position. |
|   | 4. specifies the contents of an enclosed register. |
| (( )) | designates the address of the enclosed variable. |
| A | designates that the following literal is an absolute address. |
| I | indicates that a following address is indirect. |
| a(n) | designates the first n elements of a following array. |
| w(n) | designates the last n elements of a following array. |
| e(n) | designates a vector of n ones. |
| e(n)' | designates a vector of n zeroes. |
| e(j,n) | designates an n element vector having n-1 ones with a zero in the j-th position. |
| e(j,n)' | designates an n element vector having n-1 zeroes with a one in the j-th position. |
| r | represents the number of elements in a following designated vector, matrix, or matrix row or column. |
| d | represents the number of dimensions in a following array. |
| X | indicates that a following literal string is represented in hexadecimal notation. |
| B | indicates that a following literal string is in binary notation. |
| BCD | indicates that a following literal string of decimal digits is represented in binary-coded decimal form. |
| X3 | indicates that a following literal string of decimal digits is represented in excess-3 notation. |
| %n=X% | indicates that n characters or n sequences of characters represented by X are to be inserted at the location in a literal string where the expression occurs. |
| / | 1. signifies that a preceding operator is applied to all the elements (or rows) of a following array. |
|   | 2. encloses statements pertaining to input or output operations. |
| // | 1. signifies that a preceding operator is applied to all the columns of a following designated array. |
|   | 2. encloses statements pertaining to manual or off-line operations. |
|   | 3. indicates a conclusion deduced from preceding premise(s). |
| , | 1. indicates concatenation of the preceding and following vectors. |
|   | 2. serves as a general delimiter. |
| = | indicates that the value of the right-hand expression replaces the value of the left-hand variable(s). |
| ; | 1. separates statements on the same line. |
|   | 2. separates indices of different dimensions. |
| : | 1. indicates a comparative test. |
|   | 2. separates a label from the following statement. |
|   | 3. serves as a general logical delimiter. |
| ? | follows and identifies a test statement. |
| " | encloses a string of literals. |
| ¢ | encloses comments. |
| * | 1. signifies the multiplication operation. |
|   | 2. indicates present address. |
| − | 1. signifies the subtraction operation. |
|   | 2. indicates the next address. |
| . | terminates the CASE statement. |

Upper case letters are usually used for variables, mnemonics, and the key words of the special statements.

Lower case letters are usually used for reserved words having a predetermined function.

Test Statements

A test statement is the equivalent of a decision block in a flowchart and can be either a logical test or a comparative test. A test statement is identified by a following question mark and parentheses enclosing an identifier of the step to which a branch is to be taken depending on the results of the specified test.

A logical test is expressed as a single logical variable or as an expression using any combination of arithmetical, logical, and relational operations. The parentheses following the question mark after the test indicates the step number or label to which a branch is to be taken if the test result is true. If the parentheses are followed by a NOT operator ('), the branch is taken if the test result is false. If the branch is not to be taken based on the test results, then the next statement in sequence is executed.

A comparative test is indicated by a colon separating a left-hand and a right-hand expression. The parentheses after the following question mark enclose three step numbers or labels separated by commas, being the branch destinations if the value of the left-hand expression is less than, equal to, or greater than the value of the right-hand expression, respectively.

Arrays and Indexing

Arrays are declared by name followed by the dimensions in parentheses. The initial and final index values, separated by a comma, are specified as a pair for each dimension, each pair being separated by a semicolon.

An element of an array, i.e., a subscripted variable, is specified by the array name followed by the indices of the element in parentheses and separated by semicolons.

Special Statements

Five special statements are included to provide greater facility and conciseness in the writing and reading of programs. These statements represent commonly used sequences of individual instructions that perform conditional functions or looping operations. The key words of the special statements are written in upper case letters.

In the following explanations, s1, s2, . . . , sn, sm represent statements or sequences of statements.

The special conditional statements are the IF-THEN and the CASE statements.

IF-THEN Statements

The form of the statement is

IF (condition) THEN s1 ELSE s2 FIN

The statement s1 is executed if the condition is true, and statement s2 is executed if the condition if false. The condition can be a single logical variable or a logical expression which is evaluated using the existing values of the variables.

The ELSE is optional and, if omitted, a false condition will cause the next statement in sequence following FIN to be executed.

FIN is used to terminate the statement since since s1 or s2 can include more than one statement.

CASE Statements

The form of the statement is
CASE
:(condition 1): s1,
:(condition 2): s2, . . .

:(condition n): sn,
:ELSE: sm.

The conditions, starting with the first, are evaluated and the statement associated with the first true result is executed, the remaining statements being ignored even if true. Usually, however, the conditions are mutually exclusive.

The ELSE is optional. If none of the conditions is found to be true, the statement associated with ELSE is executed. IF ELSE is omitted, the absence of any true condition causes the statement following the period, which terminates the CASE statement, to be executed. Commas are used to delimit the statements associated with each of the conditions.

The special looping statements are the WHILE-LOOP, REPEAT-UNTIL, and FOR-NEXT statements.

WHILE-LOOP Statements

The form of the statement is

WHILE condition s1 LOOP

The condition is evaluated and if true, the statement s1 terminated by the key word LOOP, is executed. This continues until the condition is false, at which time the statement following the key word LOOP is executed.

REPEAT-UNTIL Statements

The form of the statement is

REPEAT s1 UNTIL (condition)

The statement s1 is executed and the condition tested. If the condition is false, then the statement s1 is again executed. When the condition is true, the statement following the condition, which is delimited by colons, is executed.

In this statement, unlike the WHILE-LOOP, the statement s1 is executed at least once, regardless of the condition.

FOR-NEXT Statements

The form of the statement is

FOR (v)=(i) TO (f) BY (d) s1 NEXT

The variable, (v), is set to an initial value, (i). It is then compared to the final value (f). If the absolute value of (v) is not greater than that of the final value, (f), the statements s1 are executed. The incremental value (d) is added to the variable (v) and the comparison repeated. When the absolute value of (v) exceeds (f), the program continues with the statements following the terminating key word NEXT. (Absolute values are used in the calculations so that negative numbers can be specified). The variable (v) is available for program use, e.g., as an index, but its value should not be altered.

The BY is optional. If not specified, the value of +1 is used for (d).

The key words of the special statements should be written on separate lines if the entire special statement can not be written on a single line. Two key words should not otherwise be written on the same line. If a key word is not followed by an executable statement, then the line is not numbered.

Indentations may be used to improve readability of the program but too many indented spaces become a problem, especially when labels are used. The readability of programs can be improved by writing after the terminal key words, viz., FIN, LOOP, NEXT, and REPEAT, the step number of the initial related key word. Also, the terminal key word NEXT can be followed by the applicable variable name.

Reserved Words

These words are used only for convenience and are not required. Their use, however, makes a program easier to read and to understand.

begin, end—identifies the starting and finishing lines of an in-line program module; begin is usually followed by a program name; end is always used to indicate the end of a module, subroutine, and so on.

call—indicates a branch to a named out-of-line subroutine or function; parameters used by the subroutine are listed after the name of the called subroutine, the input and output variables being separated by a colon and the variables being separated by commas.

enter—identifies the beginning of an out-of-line subroutine; it is usually followed by an identifying name with the parameters specified as noted for "call".

return—indicates a final statement of an out-of-line subroutine and causes the program sequence to continue after the call statement that invoked the subroutine; there can be more than one return statement in a subroutine.

array—indicates that the following named variables, separated by commas and terminated with a semicolon, are arrays.

integer—indicates that the following named variables, arranged as noted for "array", are integer values and operations thereon are implied to integer operations.

logical—indicates that the following named variables, arranged as noted for "array", are logical values.

real—indicates that the following named variables, arranged as noted for "arrays", are real numbers and operations thereon are implied to be real operations; mixed real and integer variables in an expression imply real operations.

complex—indicates that the following named variables, arranged as noted for "arrays", are complex numbers and operations thereon are implied to be complex operations; mixed real and complex variables in the same expression imply complex operations.

field—indicates that the following named variable is treated as a unit although its constituent variables, named in parenthesis, remain individually addressable.

origin—indicates that the location counter is to be set at the specified value.

Reserved Functions

Certain functions are used frequently and may be written as in-line code in a module, as an inserted separate module, or as a subroutine. If the latter, writing the function in an expression is equivalent to calling it with the proper parameters which represent the arguments. Most of the functions are supplied with compilers.

The function name in an expression is replaced by the value calculated from the argument which can be a constant, a variable, an array, or an expression. If an array, each element of the argument array produces an element in a result array unless otherwise noted for the function. An argument written as an expression is evaluated to produce the argument.

The arguments for trigonometric functions are to be expressed in radians.

| | |
|---|---|
| entr(arg) | rounds argument off to nearest integer. |
| int(arg) | extracts the integer part of the argument. |
| frac(arg) | extracts the fractional part of the argument. |
| sin(arg) | sine of the argument. |
| cos(arg) | cosine of the argument. |
| tan(arg) | tangent of the argument. |
| cot(arg) | cotangent of the argument. |
| sec(arg) | secant of the argument. |
| csc(arg) | cosecant of the argument. |
| hav(arg) | haversine of the argument. |
| deg(arg) | converts radian argument to degrees. |
| rad(arg) | converts degree argument to radians. |
| atn(arg) | arctangent of the argument. |
| asn(arg) | arcsine of the argument. |
| acs(arg) | arccosine of the argument. |
| gcd(arg1,arg2) | greatest common divisor of the arguments. |
| lcm(arg1,arg2) | least common multiple of the arguments. |
| abs(arg) | absolute value of the argument. |
| sgn(arg) | Signum function of the argument. |
| rem(arg1,arg2) | remainder of arg1 when divided by arg2. |
| sqrt(arg) | square root of the argument. |
| crt(arg) | cube root of the argument. |
| max(array) | maximum value in array. |
| min(array) | minimum value in array. |
| chg(arg1,arg2) | interchange arg1 and arg2. |
| log(arg) | common logarithm of the argument. |
| nln(arg) | natural logarithm of the argument. |
| exp(arg) | natural exponentiation. |
| sq(arg) | square of the argument. |
| fac(arg) | factorial of the argument. |
| gam(arg) | gamma function of the argument. |
| inv(arg) | inverse of the argument which must be a square matrix. |
| det(arg) | determinant of the argument which must be a square matrix. |
| tr(matrix) | transform of the matrix argument. |

What is claimed is:

1. Apparatus for encoding a two-dimensional graphic image comprising the combination of:
means for converting said graphic image to a representative binary matrix;
means for segmenting contiguous groups of like elements in said binary matrix into binary submatrices;
means for storing identifiable binary submatrices as templates;
means for comparing said binary submatrices with selected templates and for supplying a match signal when a binary submatrix substantially matches one of said selected templates;
means for replacing substantially matched binary submatrices in said binary matrix with blank submatrices in response to said match signal;
means for encoding said binary matrix as a data stream; and
means for inserting in said data stream identifying data representative of a substantially matched selected template at a point in said data stream relative to the location of the corresponding substantially matched binary submatrix.

2. The invention as claimed in claim 1 wherein said converting means comprises:
means for scanning said graphic image line by line including means for producing binary signals of one value when a scanned position of said graphic image is dark and of the other value when said scanned position is light; and
memory means coupled to said scanning means for storing said binary signals as a binary matrix.

3. Apparatus for transmitting facsimile data representing a two-dimensional graphic image comprising the combination:
Transmitting means for sending a data stream and including;
(a) means for converting said graphic image to a representative binary matrix,
(b) means for segmenting contiguous groups of like elements in said binary matrix into binary submatrices,
(c) first means for storing identifiable binary submatrices as templates,
(d) means for comparing said binary submatrices with selected templates and for supplying a match signal when a binary submatrix substantially matches one of said selected templates,
means for replacing substantially matched binary submatrices in said binary matrix with blank submatrices in response to said match signal,
(f) means for encoding said binary matrix as a data stream, and
(g) means for inserting in said data stream identifying data representative of a substantially matched selected template at a point in said data stream relative to the location of the corresponding substantially matched binary submatrix;
receiving means for receiving said data stream and including;
(a) second means for storing identifiable binary submatrices as templates,
(b) means for inserting an identified selected template in said binary matrix at a location specified by the position of said identifying data in said data stream.

4. The invention as claimed in claim 3 further including in said transmitting means:
(h) means responsive to said comparing means for storing a binary submatrix as an identifiable template in the absence of a match signal.

5. The invention as claimed in claim 4 further including in said transmitting means:
(i) means for inserting in said data stream identifying data representative of an unmatched binary submatrix at a point in said data stream representative of the location of said unmatched binary submatrix in said binary matrix,
and further including in said receiving means;
(c) means for extracting in response to identifying data in said data stream an unmatched binary submatrix, and
(d) means for storing extracted identified unmatched binary submatrices as templates in said second storing means.

6. The invention as claimed in claim 4 wherein said receiving means includes:
(e) means for recognizing unmatched binary submatrices in said data stream, and
(f) means for storing unmatched binary submatrices appearing in said data stream in said second storing means.

7. A method for transmitting a graphic image comprising the steps of:
scanning said graphic image in two dimensions to produce information signals representing light and dark areas of said image;
storing said information signals as binary values;

segmenting contiguous like binary values of one kind as separate figures;

storing selected separate figures as identifiable templates;

comparing separate figures with said identifiable templates;

producing a match signal when a separate figure substantially matches an identifiable template;

removing matched separate figures by changing said like binary values to binary values of the other kind in response to said match signal to leave a residual image representation;

encoding said residual image representation into a data stream;

inserting into said data stream identifying data for identifying a template substantially matching a separate figure at a point in said data stream corresponding to the position from which said separate figure was removed;

transmitting said data stream with said inserted identifying data;

receiving said data stream with said inserted identifying data;

decoding said data stream into a reconstructed residual image; and interjecting said identified template in said reconstructed residual image at a location defined by the point of said identifying data in the data stream to form said graphic image.

8. The invention as claimed in claim 7 including the additional steps of after said removing step:

selecting for storage a compared separate figure as an identifiable template in the absence of said match signal;

including in said identifying data information denoting that a corresponding non-removed separate figure is a new identifiable template;

after said interjecting step:

storing in response to said information included in said identifying data a replica of said corresponding non-removed figure as an identifiable template identified by said inserted identifying data.

9. The invention as claimed in claim 7 including the additional steps of after said removing step:

selecting for storage a compared separate figure as an identifiable template in the absence of said match signal;

after the interjecting step, the step of:

recognizing a non-removed separate figure as an identifiable template identified by said inserted identifying data.

* * * * *